United States Patent
Yamasaki et al.

(10) Patent No.: US 10,140,871 B2
(45) Date of Patent: Nov. 27, 2018

(54) WIRELESS SYSTEM AND OPERATION MANAGEMENT SERVER

(71) Applicant: HITACHI CONSTRUCTION MACHINERY CO., LTD., Tokyo (JP)

(72) Inventors: Ryota Yamasaki, Tokyo (JP); Tsutomu Yamada, Tokyo (JP); Tomoyuki Hamada, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 295 days.

(21) Appl. No.: 15/124,138

(22) PCT Filed: Apr. 22, 2015

(86) PCT No.: PCT/JP2015/062250
§ 371 (c)(1),
(2) Date: Sep. 7, 2016

(87) PCT Pub. No.: WO2016/031300
PCT Pub. Date: Mar. 3, 2016

(65) Prior Publication Data
US 2017/0018190 A1    Jan. 19, 2017

(30) Foreign Application Priority Data
Aug. 25, 2014    (JP) .................................. 2014-170833

(51) Int. Cl.
*G06F 17/00*    (2006.01)
*G08G 1/00*    (2006.01)
(Continued)

(52) U.S. Cl.
CPC ............. *G08G 1/207* (2013.01); *G01C 21/20* (2013.01); *G01C 21/3461* (2013.01);
(Continued)

(58) Field of Classification Search
CPC ........ G08G 1/207; H04W 4/44; H04W 4/029; H04W 4/04; H04W 16/18; H04W 24/08;
(Continued)

(56) References Cited

U.S. PATENT DOCUMENTS 5,586,030 A * 12/1996 Kemner ............... G05D 1/0257
340/909
9,473,885 B2 * 10/2016 Yamasaki ............. H04W 4/029
(Continued)

FOREIGN PATENT DOCUMENTS

JP    2011-130080 A    6/2011
JP    2011-139186 A    7/2011
(Continued)

OTHER PUBLICATIONS

International Search Report of PCT/JP2015/062250 dated Jun. 9, 2015.

*Primary Examiner* — Shardul D Patel
(74) *Attorney, Agent, or Firm* — Mattingly & Malur, PC

(57) ABSTRACT

A wireless system for a mine performs a management of the quality of wireless communication at each point in the mine at a time point closer to a current time while maintaining the operating state of each dump truck. The wireless system is provided with a server, wireless base stations and dump trucks in the mine. The server contains fleet operations management information and communication quality information, and the dump trucks each include a GPS and a wireless terminal. The server specifies an update target point where the communication quality information requires an update. Then, the server specifies one of the dump trucks, which is plan to travel through the update target point, from the fleet operations management information, calculates a time at which the dump truck would arrive at the update (Continued)

target point, and performs communication trigger processing to make the dump truck transmit wireless data.

12 Claims, 15 Drawing Sheets

(51) Int. Cl.
| | |
|---|---|
| *H04W 4/04* | (2009.01) |
| *H04W 16/18* | (2009.01) |
| *G01C 21/20* | (2006.01) |
| *G01C 21/34* | (2006.01) |
| *G01C 21/36* | (2006.01) |
| *G05D 1/00* | (2006.01) |
| *G05D 1/02* | (2006.01) |
| *H04L 29/08* | (2006.01) |
| *H04W 4/029* | (2018.01) |
| *H04W 4/44* | (2018.01) |
| *H04W 24/08* | (2009.01) |

(52) U.S. Cl.
CPC ....... *G01C 21/3676* (2013.01); *G05D 1/0088* (2013.01); *G05D 1/0291* (2013.01); *G05D 1/0297* (2013.01); *H04L 67/18* (2013.01); *H04W 4/029* (2018.02); *H04W 4/04* (2013.01); *H04W 4/44* (2018.02); *H04W 16/18* (2013.01); *G05D 2201/021* (2013.01); *H04W 24/08* (2013.01)

(58) Field of Classification Search
CPC .. G05D 1/0297; G05D 1/0291; G05D 1/0088; G05D 2201/021; G01C 21/3461; G01C 21/20; G01C 21/3676; H04L 67/18
USPC ............ 701/1, 14, 19, 24, 35, 537; 455/423, 455/424, 425, 456.1; 707/104.1; 705/17.23
See application file for complete search history.

(56) References Cited

U.S. PATENT DOCUMENTS

| | | | | |
|---|---|---|---|---|
| 2009/0215443 | A1* | 8/2009 | Dickey | H04W 24/08 455/424 |
| 2011/0159806 | A1* | 6/2011 | Yamada | H04L 1/1867 455/9 |
| 2011/0223930 | A1* | 9/2011 | Todd | H04W 24/08 455/456.1 |
| 2014/0132422 | A1* | 5/2014 | Borland | G08G 1/0112 340/907 |
| 2015/0206355 | A1* | 7/2015 | Hubbard | G07C 5/008 701/1 |
| 2016/0217690 | A1* | 7/2016 | Yamasaki | H04W 4/046 |

FOREIGN PATENT DOCUMENTS

| | | |
|---|---|---|
| WO | 2005/041519 A2 | 5/2005 |
| WO | 2013/065411 A1 | 5/2013 |
| WO | 2014/102999 A1 | 7/2014 |

* cited by examiner

FIG. 6

| COMMUNICATION POSITION | NUMBER OF SUCCESSFUL COMMUNICATION ATTEMPTS | RECEIVED POWER VALUE | UPDATE TIME |
|---|---|---|---|
| ... | ... | ... | ... |
| $X_{n-1}, Y_{n-1}$ | $C_{n-1}$ | $Q_{n-1}$ | T0 |
| $X_n, Y_n$ | $C_n$ | $Q_n$ | T0−m1 |
| $X_{n+1}, Y_{n+1}$ | $C_{n+1}$ | $Q_{n+1}$ | Tn+1 |
| $X_{n+2}, Y_{n+2}$ | $C_{n+1}$ | $Q_{n+1}$ | T0−m2 |
| $X_{n+3}, Y_{n+3}$ | $C_{n+1}$ | $Q_{n+1}$ | Tn+3 |

FIG. 7

| DUMP TRUCK ID | FORWARD BOUNDARY POINT COORDINATES | BACKWARD BOUNDARY POINT COORDINATES | TRAVEL SPEED | TRAVEL DIRECTION | CURRENT POSITION | CURRENT POSITION RECEIPT TIME |
|---|---|---|---|---|---|---|
| ... | ... | ... | ... | ... | ... | ... |
| D1 | $x_{n-2}, y_{n-2}$ | $x_n, y_n$ | V1 | F | $x_{n-1}, y_{n-1}$ | T0 |
| D2 | $x_n, y_n$ | $x_{n+2}, y_{n+2}$ | V2 | R | $x_{n+1}, y_{n+1}$ | Tn+1 |
| D3 | $x_{n+2}, y_{n+2}$ | $x_{n+4}, y_{n+4}$ | V3 | F | $x_{n+3}, y_{n+3}$ | Tn+2 |

WIRELESS SYSTEM AND OPERATION MANAGEMENT SERVER

TECHNICAL FIELD

This invention relates to a wireless system and a fleet operations management server, and especially to a management of communication quality in a wireless system that connects plural haulage vehicles, which travel in amine, and a fleet operations management server, which performs a fleet operations management of the haulage vehicles, together.

BACKGROUND ART

As documents that describe technologies on wireless systems used in specific areas in mines and the like, there are Patent Document 1 and Patent Document 2.

Patent Document 1 discloses configurations that hierarchical positions (hierarchical levels) according to a predetermined dependency relationship are applied to items of apparatus arranged in a worksite and connected to a network to perform tasks and to receive and/or transmit data and that a correspondence between each item of apparatus and an address structure reflecting the hierarchical position of that item of apparatus is stored to manage communication. At the time of communication, corresponding one of the items of apparatus is selected on the basis of the address structure to establish a communication connection.

On the other hand, Patent Document 2 discloses an information-gathering system that gathers operation information from dump trucks which are traveling in a mine. Via wireless communication equipment, this information-gathering system transmits, at predetermined timings, position information request commands to request transmission of position information of the dump trucks. With respect to each dump truck from which a response has been received at the wireless communication equipment, the information-gathering system gathers operation information of the dump truck, from which the wireless communication equipment has received the response, if the dump truck is able to stay within a communication range of on-board wireless communication equipment until completion of the communication of its own operation information.

PRIOR ART DOCUMENTS

Patent Documents

Patent Document 1: WO 2005/041519
Patent Document 2: WO 2013/065411

DISCLOSURE OF THE INVENTION

Problem to be Solved by the Invention

A mine has a characteristic feature that terrain changes tend to occur due to digging and dumping and the wireless propagation environment is hence prone to changes. To maintain well the wireless propagation environment at each point in a mine, it is, therefore, required to carry out its management by more frequently updating communication quality information with changes from the current terrain and propagation environment. It may hence be contemplated to make a mobile survey vehicle travel together with haulage vehicles, which are traveling in amine, to collect communication quality information.

However, the operating state of haulage vehicles in a mine significantly affects the productivity of the mine, so that there is a desire to avoid lowering the travel speeds of the haulage vehicles or increasing the inter-vehicle distances for the purpose of allowing such a mobile survey vehicle to travel. In this respect, that is, about the desire to grasp the current levels of wireless communication quality at individual points in a mine while avoiding a decrease in the operating state of haulage vehicles, nothing is taken into consideration in Patent Documents 1 and 2.

With the foregoing actual circumstances in view, the present invention has as an object thereof the provision of a wireless system and a fleet operations management server which make it possible to perform a management of the wireless communication quality at each point in a mine at a time point closer to the current time.

Means for Solving the Problem

To solve the above-described problem, the present invention is characterized in that in a wireless system for communicably connecting plural haulage vehicles, which travel in a mine, and a fleet operations management server, which manages operation of the respective haulage vehicles, together via a wireless communication network, the haulage vehicles each comprise position calculating equipment that calculates a position of an own vehicle of the haulage vehicle, and a terminal-side communication control unit that performs control to conduct a wireless communication with the fleet operations management server; the fleet operations management server comprises a server-side communication control unit that performs control to conduct a wireless communication with each haulage vehicle, a fleet operations management information storage unit that stores fleet operations management information including the position of the own vehicle of each haulage vehicle as received from the haulage vehicle, a communication quality information editing unit that performs edition of communication quality information, in which point identification information specifically identifying individual points in the mine, communication quality index values indicating quality levels of conditions of connections to the wireless communication network at the points, and update times indicating times at which the communication quality index values were updated lastly, are associated with each other, and an update timing monitoring unit that specifies, each one of the points, at which one point the communication quality index value does not satisfy a condition for allowing to consider the communication quality index value to be a communication quality index value at a current time, as an update target point and performs communication trigger processing to trigger communication for newly acquiring a communication quality index value of the update target point; the update timing monitoring unit specifies one of the haulage vehicles, which one haulage vehicle is planned to travel through the update target point, as a target vehicle on a basis of the fleet operations management information, calculates an estimated arrival time at which the target vehicle would arrive at the update target point, and performs processing to make the target vehicle conduct transmission of wireless data as the communication trigger processing at the estimated arrival time; the terminal-side communication control unit of the target vehicle performs the transmission of the wireless data, which includes the position of the own vehicle, to the fleet operations management server at the estimated arrival time;

and the communication quality information editing unit updates the communication quality information on a basis of the wireless data received.

Owing to the communication trigger processing performed by the update timing monitoring unit, the on-board communication control unit of the target vehicle performs the transmission of the wireless data, which includes the position of the own vehicle, to the fleet operations management server at the estimated arrival time of the target vehicle at the update target point. If the target vehicle travels as planned, the position of the own vehicle of the target vehicle substantially registers with the update target point. Upon delivery of the wireless data to the fleet operations management server, it is now understood that connection is feasible from the update target point to the wireless communication network. The communication quality information editing unit then updates the communication quality index value at the update target point by using the wireless data, whereby the current communication quality index value can be reflected to the communication quality information.

The present invention may also be characterized in that in the above-described configurations, the update timing monitoring unit uses, as the condition, at least one of that a time elapsed from the update time is less than a time threshold level for determining whether the communication quality index value is new or old, that a sampling number of communication quality index values at the update target point is equal to or greater than a specified number of times set beforehand to ensure effectiveness of the communication quality index value, and that none of the communication quality index values are missing.

If the elapsed time exceeds the time threshold level or if the sampling number of communication quality information is short of the specified number of times set beforehand, the communication quality index value may be too old or the communication quality may not have been accurately calculated. If one or more communication quality index values are missing, the communication quality cannot be determined at all. If the conditions of acquisition of the communication quality index values are inadequate as described above, the update timing monitoring unit can performing communication trigger signal processing to eliminate the inadequate conditions of acquisition, so that a current communication quality index value can be acquired.

The present invention may also be characterized in that in the above-described configurations, the update timing monitoring unit transmits, as the communication trigger processing, a quality-measuring signal, which is for measuring communication quality, to the target vehicle at the estimated arrival time; and the terminal-side communication control unit of the target vehicle returns, to the fleet operations management server, a quality response signal indicating that the quality-measuring signal has been received.

By using a quality-measuring signal and a quality response signal which are exclusive signals for the acquisition of communication quality index values, they can be distinguished from signals commonly used between the haulage vehicles and the fleet operations management server.

The present invention may also be characterized in that in the above-described configurations, the quality-measuring signal includes signal identification information that can specifically identify the quality-measuring signal, and the quality response signal includes signal identification information of the quality-measuring signal to be responded.

The configurations described immediately above clarify to which quality-measuring signal the quality response signal corresponds, whereby facilitating to discriminate that communication has been established.

The present invention may also be characterized in that in the above-described configurations, the fleet operations management server further comprises a travel-permitted zone setting unit that sets, for each haulage vehicle, at least one of segments of a section of a preset travel route in the mine as a travel-permitted zone in which the haulage vehicle is permitted to travel; each haulage vehicle further comprises a request information processing unit that produces travel permit request information to request the fleet operations management server to set and grant a new travel-permitted zone, and a travel control unit that allows each haulage vehicle to autonomously travel according to the travel-permitted zone received from the fleet operations management server; the terminal-side communication control unit transmits the travel permit request information when each haulage vehicle has reached a permit request point located on a side nearer by a permit request distance, which has been set in view of a stoppable distance of the own vehicle, from an end part of the travel-permitted zone granted to the own vehicle; the update timing monitoring unit outputs the update target point to the travel-permitted zone setting unit; and the travel-permitted zone setting unit sets the travel-permitted zone so that the permit request point registers with the update target point.

The configurations described immediately above can use, as a quality-measuring signal, the travel permit request information transmitted from the autonomously-traveling haulage vehicle to the fleet operations management server, whereby enabling to inhibit the amount of communication traffic from increasing to collect communication quality index values.

The present invention may also be characterized in that in the above-described configurations, the fleet operations management server further comprises a travel-permitted zone setting unit that sets, for each haulage vehicle, at least one of segments of a section of a preset travel route in the mine as a travel-permitted zone in which the haulage vehicle is permitted to travel; and the update timing monitoring unit specifies one of the haulage vehicles, which one haulage vehicle is traveling on a side nearer in an advancing direction than the update target point in the travel-permitted zone, as the target vehicle when the travel-permitted zone with the update target point included therein has been set, or specifies one of the haulage vehicles, which one haulage vehicle is traveling in a travel-permitted zone set at a closest position on a side nearer than the update target point when the travel-permitted zone with the update target point included therein has not been set yet or when the haulage vehicle, which is traveling in the travel-permitted zone, has passed through the update target point even if the travel-permitted zone with the update target point included therein has been set.

Owing to the configurations described immediately above, the target vehicle can be specified in the case of the autonomously-traveling haulage vehicle by simply referring to the travel-permitted zone and the current position of the haulage vehicle. It is, therefore, possible to lower the load of arithmetic processing, for example, in comparison with a case that the target vehicle is specified by calculating the estimated arrival times of all the haulage vehicles.

The present invention may also be characterized in that in the above-described configurations, the update timing monitoring unit calculates the estimated arrival times of the respective haulage vehicles, and specifies one of the haulage vehicles, which one haulage vehicle indicates fastest one of the estimated arrival times, as the target vehicle.

Owing to the configurations described immediately above, the communication quality index values at the update target point can be acquired using haulage vehicles, which are in operation, irrespective of whether the haulage vehicles are autonomously-traveling haulage vehicles or manned haulage vehicles each steered by a riding operator.

The present invention may also be characterized in that in the above-described configurations, the update timing monitoring unit calculates the estimated arrival time of each haulage vehicle in accordance with the following formula (1):

$$t = t_0 + (P_1 - P_0) \div V_0 \qquad (1)$$

where
t: time of arrival at the update target point
$t_0$: current time
$P_0$: current position of the haulage vehicle
$P_1$: position of the update target point
$V_0$: travel speed of the haulage vehicle.

Owing to the configurations described immediately above, the estimated arrival time at the update target point can be calculated with good accuracy by taking the current time and the current position of the target vehicle into consideration, the transmission and receipt of wireless data can be performed to collect communication quality at the update target point, and the communication quality information at the update target point can be updated.

The present invention may also be characterized in that in the above-described configurations, the fleet operations management information includes vehicle identification information that specifically identifies the respective haulage vehicles, the current positions of the respective haulage vehicles, the update times of the current positions, the travel speeds and travel directions of the respective haulage vehicles, and zones information set for the respective haulage vehicles; and the update timing monitoring unit calculates the estimated arrival time of the target vehicle at the update target point with reference to the fleet operations management information.

Owing to the configurations described immediately above, the fleet operations management information contains necessary values necessary for the formula (1), so that the update timing monitoring unit can calculate the arrival time of the target vehicle at the update target point by simply referring to the fleet operations management information. The fleet operations management information is, therefore, suited for the calculation of the arrival time, which uses the formula (1).

The present invention may also be characterized in that in a fleet operations management server for being communicably connected to plural haulage vehicles, which travel in a mine, respectively, via a wireless communication network, the fleet operations management server comprises a server-side communication control unit that performs control to conduct wireless communication with each haulage vehicle, a fleet operations management information storage unit that stores fleet operations management information including a position of an own vehicle of each haulage vehicle as received from the haulage vehicle, a communication quality information editing unit that performs edition of communication quality information, in which point identification information specifically identifying individual points in the mine, communication quality index values indicating quality levels of conditions of connections to the wireless communication network at the points, and update times indicating times at which the communication quality index values were updated lastly, are associated with each other, and an update timing monitoring unit that specifies, each one of the points, at which one point the communication quality index value does not satisfy a condition for allowing to consider the communication quality index value to be a communication quality index value at a current time, as an update target point and performs communication trigger processing to trigger communication for newly acquiring a communication quality index value of the update target point; the update timing monitoring unit specifies one of the haulage vehicles, which one haulage vehicle is planned to travel through the update target point, as a target vehicle on a basis of the fleet operations management information, calculates an estimated arrival time at which the target vehicle would arrive at the update target point, and performs processing to make the target vehicle conduct transmission of wireless data as the communication trigger processing at the estimated arrival time; the server-side communication control unit receives wireless data, which includes the position of the own vehicle, from the target vehicle at the estimated arrival time; and the communication quality information editing unit updates the communication quality information on a basis of the wireless data received.

Owing to the communication trigger processing performed by the update timing monitoring unit, the on-board communication control unit of the target vehicle performs the transmission of the wireless data, which includes the position of the own vehicle, to the fleet operations management server at the estimated arrival time of the target vehicle at the update target point. If the target vehicle travels as planned, the position of the own vehicle of the target vehicle substantially registers with the update target point. Upon delivery of the wireless data to the fleet operations management server, it is now understood that connection is feasible from the update target point to the wireless communication network. The communication quality information editing unit then updates the communication quality index value of the update target point by using the wireless data, whereby the current communication quality index value can be reflected to the communication quality information.

The present invention may also be characterized in that in the configurations described above, the fleet operations management server further comprises a display unit that produces and displays at least one of an update timing image which on a basis of the communication quality information, indicates update times for the communication quality index values at the respective points, a communication quality image which indicates the communication quality index values at the respective points, and a map image in which the update target point is displayed in superimposition on a travel route along which the plural haulage vehicles travel.

Owing to the configurations described immediately above, the visual recognition of the update timing image, communication quality image and map image facilitates the user to visually recognize the conditions of acquisition of communication quality, the level of the communication quality, and the position of the update target point, whereby facilitating the user to take necessary measures.

The present invention may also be characterized in that in the configurations described above, the fleet operations management server further comprises a travel-permitted zone setting unit that sets, for each of the plural haulage vehicles, at least one of segments of a section of a preset travel route in the mine as a travel-permitted zone in which the haulage vehicle is permitted to travel, a display unit that produces and displays a map image in which the update target point and the travel-permitted zone are displayed in superimposition on the travel route along which the plural haulage vehicles travel, and an input unit that receives an operation that sets the displayed travel-permitted zone or changes a length of the travel-permitted zone; wherein the travel-permitted zone setting unit performs, according to the operation, at least one of the setting of the travel-permitted zone and the changing of the length of the travel-permitted zone.

Owing to the configurations described immediately above, the user can visually recognize the travel-permitted zone and update target point, and can set the travel-permitted zone or can change its length so that communication is triggered at the update target point.

Advantageous Effects of the Invention

The present invention can provide a wireless system and a fleet operations management server, which can perform a management of the quality of wireless communication at each point in a mine at a time point closer to a current time while maintaining the operating state of each haulage vehicle. Problems, configurations and advantageous effects other than those described above will become apparent from the description of the following embodiments.

BRIEF DESCRIPTION OF THE DRAWINGS

FIGS. 4A and 4B are diagrams illustrating the configurations of respective formats of travel permit request information and travel permit response information, in which FIG. 4A illustrates the format of the travel permit request information and FIG. 4B illustrates the format of the travel permit response information.

FIGS. 5A and 5B are diagrams illustrating the configurations of formats of a quality-measuring signal and a quality response signal, in which FIG. 5A illustrates the format of the quality-measuring signal and FIG. 5B illustrates the format of the quality response signal.

FIG. 6 is a diagram illustrating the configuration of a communication quality information table.

FIG. 7 is a diagram illustrating an example of a table of fleet operations management information to be managed by the server.

FIGS. 8A, 8B and 8C are diagrams illustrating setting processing of travel-permitted zones, in which FIG. 8A illustrates a state in which a dump truck is traveling in a travel-permitted zone n, FIG. 8B illustrates a state of the dump truck arrived at a permit request point, and FIG. 8C illustrates the state of setting of a next forward boundary point.

MODES FOR CARRYING OUT THE INVENTION

In the following embodiments, a description will be made by dividing them into plural sections or embodiments wherever needed for the sake of convenience. When the numbers of elements and the like (including the numbers of parts or components, numerical values, amounts, ranges, and so on) are referred to in the following embodiments, they shall not be limited to any specific numbers and may be greater or smaller than such specific numbers unless specifically indicated or unless apparently limited to such specific numbers in principle. In the following embodiments, their constituent elements (including processing steps and the like) are not absolutely essential unless specifically indicated or unless clearly considered to be essential in principle.

Further, the individual configurations, functions, processing units, processing means and the like in the following embodiments may be partly or wholly realized, for example, as integrated circuits or other hardware. Alternatively, the below-described individual configurations, functions, processing units, processing means and the like may be realized as programs to be executed on a computer, in other words, may be realized as software. Information on programs, tables, files and the like, which realize the individual configurations, functions, processing units, processing means and the like, can be stored in storage devices such as memories, hard disks or SSDs (Solid State Drives) or the like or storage media such as IC cards, SD cards or DVDs.

The embodiments of the present invention will hereinafter be described in detail based on the drawings. Throughout the drawings that show or illustrate the embodiments, members having the same functions are identified by the same or related designations, and their repeated descriptions will be omitted. It is also to be noted that in the following embodiments, the description of the same or similar parts will not be repeated as a general rule unless specifically needed.

First Embodiment

System Configurations

A first embodiment relates to a vehicle travel system that connects haulage vehicles, which haul rock or ore loaded by loading machines such as excavators or wheel loaders in a mine, and a control center, which controls the positions and traveling state of the loading machines and haulage vehicles, together via a wireless communication network, and is characterized especially in that the quality information of wireless communication is collected by the haulage vehicles, which are in operation. With reference to the drawings, the vehicle travel system according to the first embodiment of the present invention will hereinafter be described.

Figure 1:
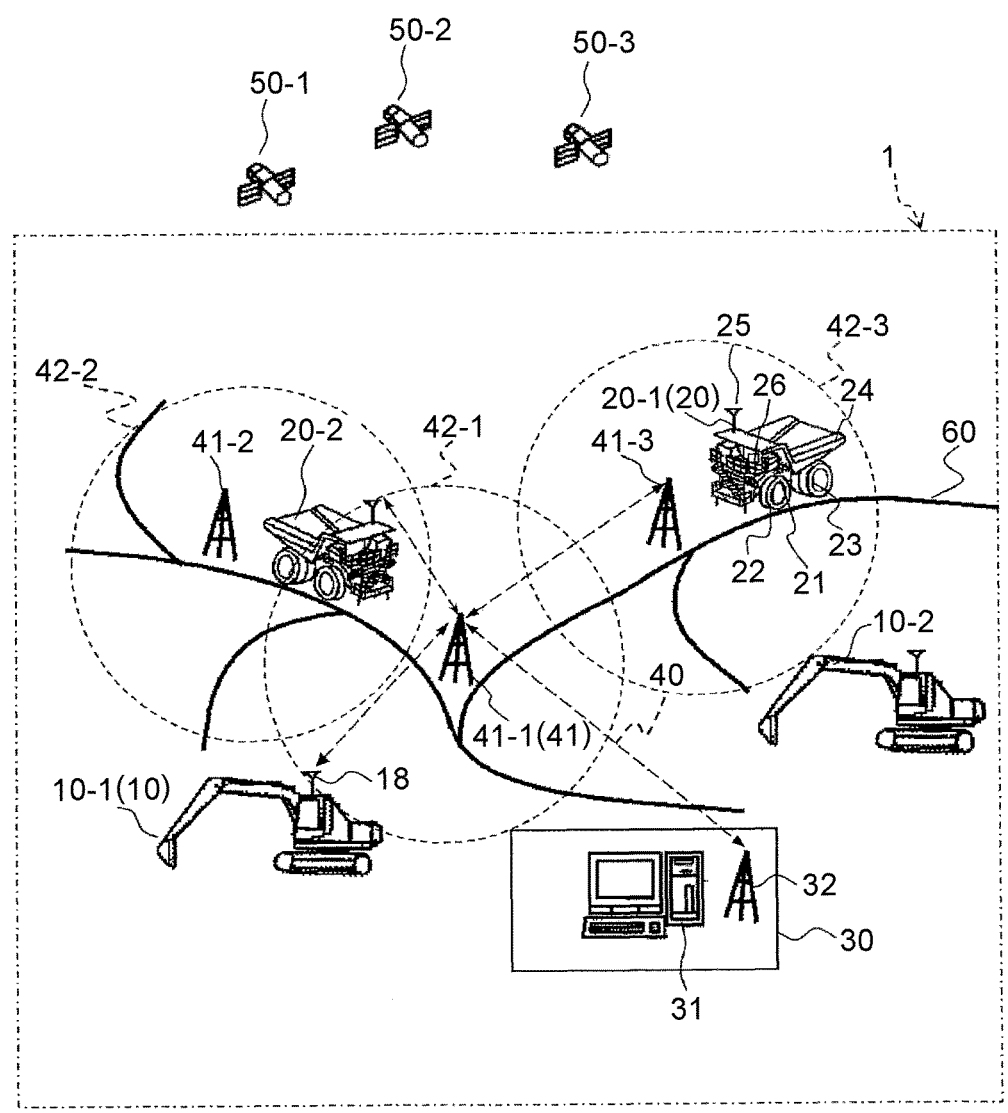
FIG. 1 is a diagram illustrating the schematic configurations of a vehicle travel system according to a first embodiment.

Based on FIG. 1, a description will first be made about the schematic configurations of the vehicle travel system according to the first embodiment. FIG. 1 is a diagram illustrating the schematic configurations of the vehicle travel system according to the first embodiment. The vehicle travel system 1 illustrated in FIG. 1 includes excavators 10-1,10-2, haulage vehicles (hereinafter called "dump trucks") 20-1, 20-2, and a fleet operations management server 31. The excavators 10-1,10-2 perform loading work of rock or ore at a quarry as a mine. The dump trucks 20-1,20-2 haul a payload such as rock or ore there. The fleet operations management server 31 is installed at a control center 30 which is near to or remote from the quarry. The dump trucks 20-1, 20-2 are the same in configurations, so that they will hereinafter be described as "dump trucks 20" when the dump trucks 20-1,20-2 are collectively referred to without distinguishing them from each other. Similarly, the excavators 10-1,10-2 are the same in configurations, so that they will hereinafter be described as "excavators 10" when the excavators 10-1,10-2 are collectively referred to without distinguishing them from each other.

Each dump truck 20 travels back and forth between the excavators 10 and a dumping site (not illustrated) along a travel route 60 set beforehand in the mine, and hauls payloads. In this embodiment, the dump trucks 20 will be described taking, as examples, unmanned dump trucks that autonomously travel with riding of any operator thereon.

The excavators 10, dump trucks 20 and fleet operations management server 31 are connected for wireless communication together via a wireless communication network 40. To smoothly conduct such wireless communicative connection, plural wireless base stations 41-1,41-2,41-3 are arranged in the mine. Via these base stations, wireless communication waves are transmitted and received. Radio waves attenuate as the distances from the individual base stations 41-1,41-2,41-3 increase. Numerals 42-1,42-2,42-3 in FIG. 1 indicate ranges (hereinafter called "communication areas") within which the transmission and receipt of radio waves between the individual base stations 41-1,41-2,41-3 and the individual dump trucks 20 is feasible. Preferably, the individual base stations 41-1,41-2,41-3 are arranged so that the communication areas 42-1, 42-2, 42-3 overlap one another. This arrangement allows to achieve connection to the wireless communication network 40 from any point insofar as the point is located on the travel route 60. Each communication area is illustrated in a circular shape in FIG. 1. In practice, however, the communication areas may not be circular under the influence of terrain. The wireless base stations 41-1,41-2,41-3 are the same in configurations, so that they will hereinafter be described as "wireless base stations 41" when the wireless base stations 41-1,41-2,41-3 are collectively referred to without distinguishing them from each other.

The excavators 10 and dump trucks 20 are each provided with a position calculation system (its illustration is omitted in FIG. 1), which receives positioning radio waves from at least three navigation satellites 50-1,50-2,50-3 of a global navigation satellite system (GNSS: Global Navigation Satellite System) to acquire the position of the own vehicle. As the GNSS, GPS (Global Positioning System), GLONASS or GALILEO may be used, for example.

Each excavator 10 is a super jumbo hydraulic excavator, and an antenna 18 is installed for connection with the wireless communication network at a location of good visibility on the excavator 10, for example, on an upper part of a cab.

Each dump truck 20 includes a frame 21 that forms a main body, front wheels 22 and rear wheels 23, a body 24 pivotal in an up-and-down direction about hinge pins (not illustrated) arranged as a center of pivotal motion on a rear part of the frame 21, and a pair of left and right hoist cylinders (not illustrated) that cause the body 24 to pivot in the up-and-down direction. In addition, an antenna 25 is installed for connection with the wireless communication network 40 at a location of good visibility, for example, on a front part of a top wall of the dump truck 20. In addition, the dump truck 20 is provided with on-board terminal equipment 26 that communicates with the fleet operations management server 31 via the wireless communication network 40 to perform autonomous travel control on the dump truck 20.

The fleet operations management server 31 is connected with an antenna 32 via a wire communication network 33 (see FIG. 2), is connected with the wireless base stations 41-1,41-2,41-3 via the wireless communication network 40, and communicates with the respective excavators 10 and dump trucks 20.

Figure 2:
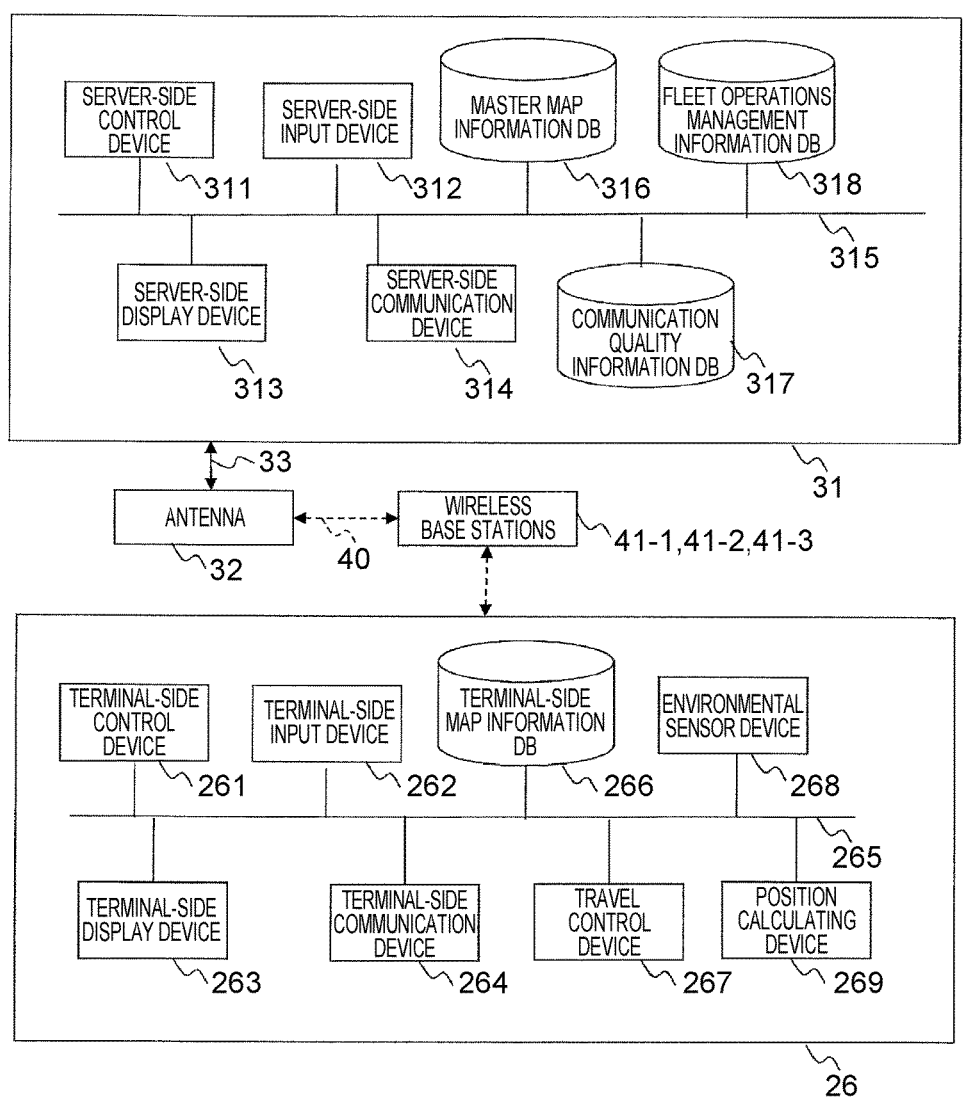
FIG. 2 is a hardware configuration diagram of a fleet operations management server and on-board terminal equipment.

Referring to FIG. 2, a description will next be made about the hardware configurations of the fleet operations management server 31 and on-board terminal equipment 26 in FIG. 1. FIG. 2 is a hardware configuration diagram of the fleet operations management server and on-board terminal equipment.

As illustrated in FIG. 2, the fleet operations management server 31 is configured including server-side control device 311, a server-side input device 312, a server-side display device 313, a server-side communication device 314, a communication bus 315, a master map information database ("database" will hereinafter be abbreviated as "DB") 316, a communication quality information DB 317, and a fleet operations management information DB 318.

The server-side control device 311 serves to control operations of the individual constituent elements of the fleet operations management server 31, and is configured including hardware and software. The hardware includes an arithmetic and control unit such as CPU (Central Processing Unit) and storage devices such as ROM (Read Only Memory), RAM (Random Access Memory) and HDD (Hard Disk Drive). The software is to be executed by the server-side control device 311. The hardware executes software such as a communication quality management program, which pertains to the present invention, and an autonomous travel program, which is for performing autonomous travel control of the dump trucks 20, so that the individual functions of the fleet operations management server 31 are realized.

The server-side input device 312 is configured of an input device such as a mouse or keyboard, and functions as an interface that accepts input operations from an operator.

The server-side display device 313 is configured of a liquid crystal monitor or the like, and functions as an interface that displays and provides information to the operator.

As the server-side communication device 314, a wireless communication system that conforms to the standards of Wi-Fi (Wireless Fidelity) or IEEE (Institute of Electrical and Electronics Engineers) may be employed.

The communication bus 315 electrically connects the individual constituent elements one another.

The master map information DB 316 is configured using a storage device, e.g., HDD, that can store map information in a non-volatile form. The map information is defined by individual points (hereinafter called "nodes") on the travel route 60 and sublinks connecting the adjacent nodes. The map information may also contain terrain information on the mine and the absolute coordinates (three-dimensional real coordinates calculated based on positioning radio waves) of the individual nodes. To each node and each sublink, position identification information (hereinafter called "node ID" and "link ID") that specifically identify these node and sublink have been assigned.

The communication quality information DB 317 is configured using a storage device, e.g., HDD, that can store communication quality information in a non-volatile form. The communication quality information indicates the communication quality levels at the respective positions included in map information as calculated on the basis of communication quality information collected by the dump trucks 20 that have traveled on the travel route 60, and the communication quality index values, which indicate the quality levels of the conditions of connection between the dump truck 20-1 and the fleet operations management server 31 at the respective points on the travel route 60 are stored in correspondence to the node IDs. The term "communication quality index value" as used herein means communication quality information that indicates the readiness of establishment of wireless communicative connection between the fleet operations management server 31 and the dump truck 20-1, and may use, for example, a received power value, which indicates the strength level of a radio wave used for wireless connection at each node, and/or the success rate of wireless communication connections between the fleet operations management server 31 and the dump truck 20-1 at the same node. It is to be noted that the term "success rate" may be reworded as the "error rate" of communication connections. Here, the direction of the inequality sign in each threshold determination to be described subsequently herein will become opposite to that when the success rate is used.

The fleet operations management information DB 318 is configured using a storage device, e.g., HDD, that can store fleet operations management information in a non-volatile form. As the fleet operations management information, the fleet operations information on each dump truck—such as the travel-permitted zone set for the dump truck, the current position of the dump truck and the travel speed of the dump truck—are stored.

The above-described databases may each be provided with only a storage unit that stores the master map information, communication quality information and fleet operations management information, and the server-side control device 311 may perform the updating and retrieval processing of these databases. Alternatively, the databases may each include an engine that performs the updating and retrieval processing of information in the above-described, corresponding storage device. This applies equally to various data bases to be described subsequently herein.

The on-board terminal equipment 26 mounted on each dump truck 20-1 is configured including terminal-side control device 261, a terminal-side input device 262, a terminal-side display device 263, a terminal-side communication device 264, a communication bus 265, a terminal-side map information DB 266, travel control device 267, an environmental sensor device 268, and position calculating device 269.

The terminal-side control device 261 serves to control operations of the individual constituent elements of the on-board terminal equipment 26, and is configured using hardware and software. The hardware includes an arithmetic and control unit such as CPU, and storage devices such as ROM, RAM and HDD. The software is to be executed by the on-board terminal equipment 26. The software is executed by the hardware so that the individual functions of the on-board terminal equipment 26 are realized.

The terminal-side input device 262 is configured of an input device such as a touch panel or various switches, and functions as an interface that accepts input operations from an operator.

The terminal-side display device 263 is configured of a liquid crystal monitor or the like, and functions as an interface that displays and provides information to the operator.

As the terminal-side communication device 264, a wireless communication device such as a versatile wireless communication device conforming to the standards of Wi-Fi or IEEE may also be employed.

The communication bus 265 electrically connects the individual constituent elements one another.

The terminal-side map information DB 266 is configured using a storage device, such as HDD, that stores information in a non-volatile form, and stores the same map information as that stored in the master map information DB 316.

The travel control device 267 are control systems, which send an amount of acceleration or deceleration, an amount of braking and a steering angle to drive systems (hereinafter called "travel drive systems") that relate to the traveling of each dump truck 20, such as an acceleration system, brake system, steering system and the like of the dump truck 20.

The environmental sensor device 268 is a sensor, such as a millimeter-wave radar or forward camera, which detects a front obstacle in the travel direction (advancing direction) of the dump truck 20, and no limitation is imposed on its kind. The results of detection by the environmental sensor device 268 are outputted to the terminal-side control device 261, are used for the monitoring of a travel position to avoid departure from the travel route and also for an acceleration or deceleration in a normal time and in the event of an emergency, is used for a braking operation needed in an emergency evasive maneuver.

The position calculation device 269 calculates the current position of the own vehicle based on positioning radio waves from the navigation satellites 50-1,50-2,50-3 (see FIG. 1).

Figure 3:
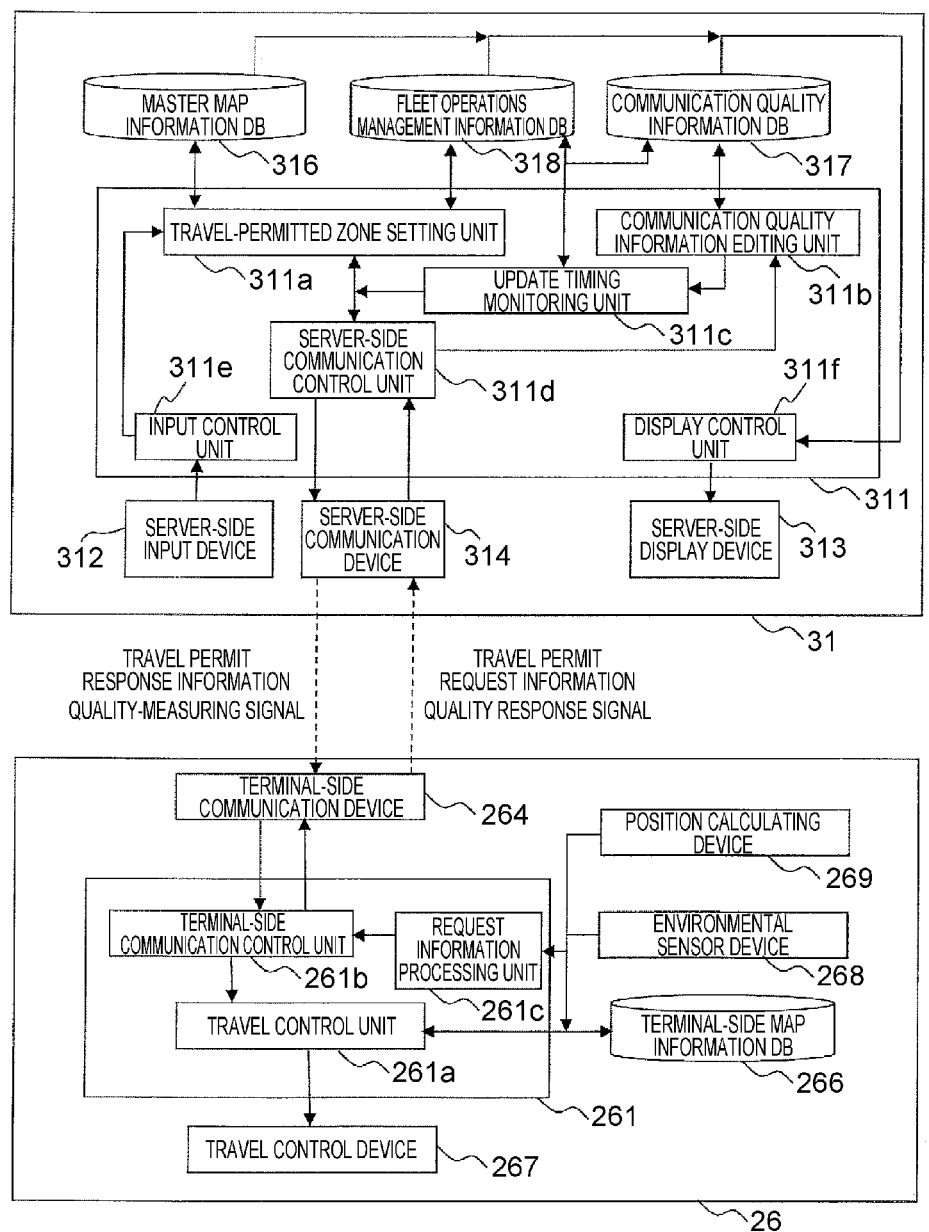
FIG. 3 is a functional block diagram showing main functions of the fleet operations management server and on-board terminal equipment in the first embodiment.

Referring to FIG. 3, a description will next be made about the functional configurations of the fleet operations management server 31 and on-board terminal equipment 26 of FIG. 1. FIG. 3 is a functional block diagram illustrating main functions of the fleet operations management server and on-board terminal equipment.

As illustrated in FIG. 3, the server-side control device 311 of the fleet operations management server 31 is provided with a travel-permitted zone setting unit 311a, a communication quality information editing unit 311b, an update timing monitoring unit 311c, a server-side communication control unit 311d, an input control unit 311e, and a display control unit 311f.

Responsive to a request from each dump truck 20, the travel-permitted zone setting unit 311a sets, with reference to the map information in the master map information DB 316 and the fleet operations management information DB 317, a forward boundary point at a point forward of the current position of the dump truck 20 on the travel route 60, and also a backward boundary point rearward of the forward boundary point. Then, at least one of segments in a section of the travel route 60, said section being located between the forward boundary point and the backward boundary point, is set as a travel-permitted zone in which traveling is permitted for the dump truck 20 that transmitted the request.

A point located on a side nearer by a permit-requesting distance, which has been set in view of a stoppable distance of the dump truck 20, from the forward boundary point is called "a permit request point", and the zone between these points is called "a permit request zone". If no travel-permitted zone can be granted to the dump truck 20 in the permit request zone by using the forward boundary point as a reference point, a stop point is set at a point that is apart by a distance within which the dump 20 can stop without traveling further beyond the forward boundary point.

The communication quality information editing unit 311b performs edition (updating) of the communication quality information stored in the communication quality information DB 317. Each communication quality index value is a value that indicates the quality level of the conditions of connection to the wireless communication network, and may use the number of successful communication connections, the probability of successful communication connections, and/or the strength level of a received radio wave, all at the corresponding point. When the communication quality information editing unit 311b uses, as a communication quality index value or values, a value or values obtained by conducting arithmetic processing on the basis of raw data indicating the conditions of connection at each point, for example, the success rate of communication connections and/or a statistic value, such as means, mode or median, of the strength levels of received radio waves, their calculation processing is conducted and the results of the processing and the updated time are written over the communication quality information. In a mode that uses the latest one as it is out of raw data indicating the conditions of communication at each point, the communication quality information editing unit 311b performs only the overwriting processing of the communication quality information.

The update timing monitoring unit 311c specifies, as an update target point, each point in the communication quality information, the communication quality index value of which does not satisfy the condition for considering the connection quality index value as a current communication quality index value at the current time, and performs communication trigger processing to trigger communication for newly acquiring a communication quality index value at the update target point. More specifically, based on the fleet operations management information, the update timing monitoring unit 311c specifies, as a target vehicle, one of the haulage vehicles, which one haulage vehicle is planned to travel through the update target point, and calculates an estimated arrival time at which the target vehicle would arrive at the update target point. As the communication trigger processing, processing is then performed to make the target vehicle conduct transmission of wireless data at the estimated arrival time. In this first embodiment, the transmission of a quality-measuring signal, which will be described subsequently herein, is conducted as communication trigger signal processing.

As an example of specifying a target vehicle by the update timing monitoring unit 311c, it may be configured, for example, to calculate the estimated arrival time of each dump truck 20 at the update target point in accordance with the below-described formula (1), and to specify, as the target vehicle, the dump truck 20 the estimated arrival time of which is the earliest. Individual values, which are to be applied to the formula (1), are configured such that they are stored beforehand in the fleet operations management information to allow the update timing monitoring unit 311c to refer to them.

$$t = t_0 + (P_1 - P_0) \div V_0 \qquad (1)$$

where
t: time of arrival at the update target point
$t_0$: current time
$P_0$: current position of the dump vehicle
$P_1$: position of the update target point
$V_0$: travel speed of the dump vehicle.

In this embodiment, the update timing monitoring unit 311c makes use of the fact that a time elapsed from an update time is less than a time threshold level for determining whether a communication quality index value is new or old. The condition is, however, not limited to the foregoing, and may also be at least one of that a sampling number of communication quality index values at the update target point is equal to or greater than a specified number of times set beforehand to ensure effectiveness of the communication quality index value, and that none of the communication quality index values are missing.

The server-side communication control unit 311d performs control to conduct wireless communication with each dump truck 20. More specifically, the server-side communication control unit 311d receives travel permit request information from each dump truck 20, and also performs control of the receipt of travel permit response information, which indicates a preset travel-permitted zone, and non-permit response information, which indicates that no travel-permitted zone has been set yet, the transmission of a quality-measuring signal, and the receipt of a quality response signal to the quality-measuring signal.

The input control unit 311e accepts operation which the user has conducted to the server-side input device 312. For example, the user can perform the input or edition of the fleet operations management information by storing the fleet operations management information in the fleet operations management information DB 318 or conducting editing operation to the stored fleet operations management information through the server-side input device 312. It is to be noted that the input control unit 311e and the server-side input device 312 may also be collectively called "an input unit".

The display control unit 311f performs the creation and display control processing of images to be displayed on the server-side display device 313. It is to be noted that the display control unit 311f and the server-side display device 313 may also be collectively called "a display unit".

A description will next be made about the on-board terminal equipment 26. The terminal-side control device 261 of the on-board terminal equipment 26 is provided with a travel control unit 261a, a terminal-side communication control unit 261b, and a request information processing unit 261c.

The travel control unit 261a performs control on the travel control device 267 to allow autonomous travel according to the current position of the own vehicle as acquired from the position calculating device 269, the map information in the terminal-side map information DB 266 and the travel-permitted zone included in the travel-permitted response information. Further, the travel control unit 261a determines the presence or absence of any front obstacle on the basis of the results of detection by the environmental sensor device 268, also determines a need or no need of an evasive maneuver from an interference with or a collision against the obstacle, and if necessary, performs control for a braking operation.

The terminal-side communication control unit 261b performs control to perform wireless communication with the fleet management server 31. More specifically, the terminal-side communication control unit 261b transmits travel permit request information to request a next travel-permitted zone. The terminal-side communication control unit 261b then receives travel permit response information indicating a travel-permitted zone that the fleet operations management server 31 has set responsive to the travel permit request information. Upon receipt of a quality-measuring signal from the fleet operations management server 31, the terminal-side communication control unit 261b returns a quality response signal that indicates the receipt of the quality-measuring signal.

The request information processing unit 261c generates, to the fleet operations management server 31, travel permit request information for requesting the setting and grant of a new travel-permitted zone. If no destination has been set yet upon initiation of a travel of each dump truck 20, the request information processing unit 261c generates destination request information to request the setting of a destination.

Figure 4A:
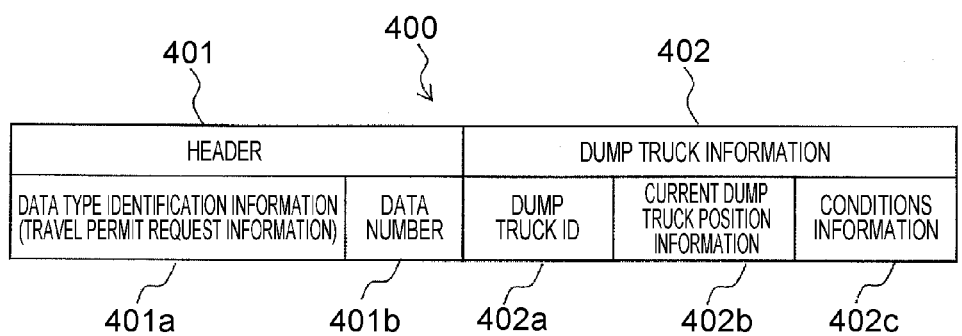
Figure 4B:
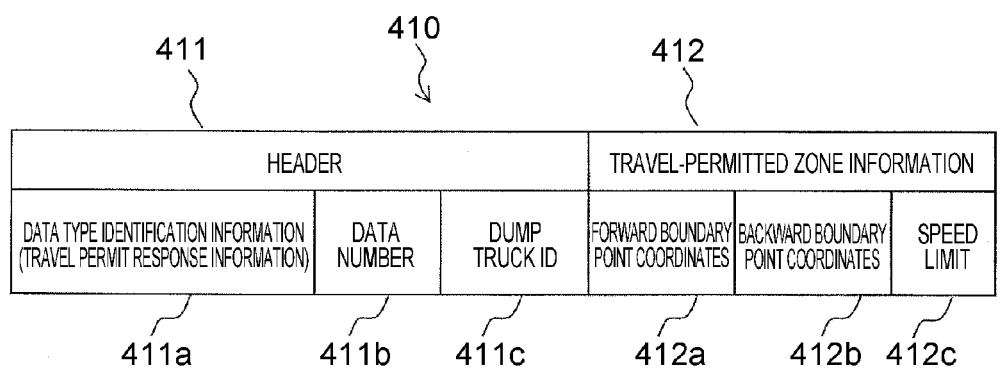
Figure 5A:
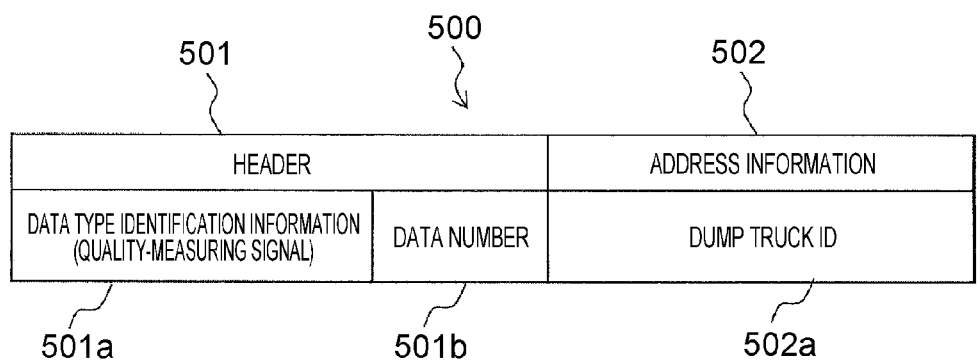
Figure 5B:
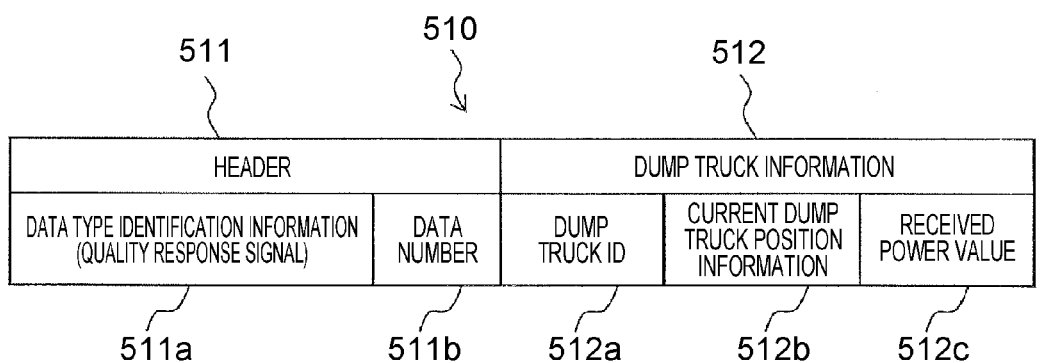

With reference to FIGS. 4A and 4B and FIGS. 5A and 5B, a description will next be made about formats of information to be transmitted and received between the fleet operations management server and each autonomously-traveling dump truck. FIGS. 4A and 4B are diagrams illustrating the configurations of respective formats of travel permit request information and travel permit response information, in which FIG. 4A illustrates the format of the travel permit request information and FIG. 4B illustrates the format of the travel permit response information. FIGS. 5A and 5B are diagrams illustrating the configurations of formats of a quality-measuring signal and a quality response signal, in which FIG. 5A illustrates the format of the quality-measuring signal and FIG. 5B illustrates the format of the quality response signal.

As illustrated in FIG. 4A, a travel permit request information format 400 is configured to be largely divided, including a header 401 and dump truck information 402. The header 401 includes data type identification information 401a for identifying the type of data and a data number 401b allotted sequentially in the data type. By combining the data type identification information 401a and the data number 401b, the travel permit request information can be specifically identified. The travel permit request information format 400 includes, as the data type identification information 401a, information (for example, a bit stream) indicating that this data is travel permit request information.

The dump truck information 402 includes a dump truck ID 402a specifically identifying the dump truck that has transmitted the travel permit request information, current dump truck position information 402b indicating the current position of the own vehicle as calculated by the position calculating device 269, and conditions information 402c indicating conditions state, such as travel speed and tire pressure, of the dump truck.

As illustrated in FIG. 4B, a travel permit response information format 410 is also configured including a header 411 and travel-permitted zone information 412. Similar to the travel permit request information format 400, the header 411 includes data type identification information 411a and a data number 411b, and in addition, a dump truck ID 411c as an address. The data type identification information 411a is, for example, a bit stream indicating to be travel permit response information, and the data number 411b includes the same number as the data number 401b which is included in the travel permit response information transmitted from the dump truck ID 411c. Owing to the foregoing, it is possible to discriminate to which travel permit request information transmitted from which dump truck the travel permit response information corresponds. Even when broadcast transmitted from the fleet operations management server 31 via the wireless communication network 40, each dump truck 20 can identify whether or not it is travel permit response information corresponding to the travel permit request information issued by the own vehicle.

The travel-permitted zone information 412 includes forward boundary point coordinates 412a and backward boundary point coordinates 412b of the newly-set travel-permitted zone, and a speed limit 412c. The forward boundary point corresponds to an end part located forward in the advancing direction in the travel-permitted zone.

As illustrated in FIG. 5A, a format 500 of a quality-measuring signal to be transmitted from the fleet operations management server 31 to the dump truck 20 is configured including a header 501 and address information 502. The header 501 includes data type identification information 501a (for example, a bit stream indicating to be a quality-measuring signal), and a data number 501b allotted sequentially in the data type. In the address information 502, a dump truck ID 502a as the destination of transmission of the quality-measuring signal is included. The data number 501b corresponds to signal identification information that specifically identifies the quality-measuring signal.

The dump truck 20 which has received the quality-measuring signal transmits a quality response signal as a confirmation of the receipt to the fleet operations management server 31. As illustrated in FIG. 5B, a format 510 of the quality response signal is configured including a header 511 and a dump truck information 512 on the dump truck that has transmitted the quality response signal. The header 511 includes data type identification information 511a (for example, a bit stream indicating to be a quality response signal) and a data number 511b included in the received quality-measuring signal. The dump truck information 512 includes a dump truck ID 512a as a source of transmission of the quality-measuring signal, and current dump truck position information 512b indicating the current position of the own vehicle as calculated by the position calculating device 269 mounted on the dump truck 20. The format 510 of the quality response signal may also include a received power value 512c corresponding to the strength level of a radio wave when the strength level of the radio wave received by the dump truck 20 is used as a communication quality index value.

Referring to FIG. 6, a description will next be made about a table configuration of communication quality information stored in the communication quality information DB 317. FIG. 6 is a diagram illustrating the configuration of a communication quality information table.

As illustrated in FIG. 6, a communication quality information table 600 includes a "Communication Position" record 601, a "Number of Successful Communication connections" record 602, a "Received Power Value" record 603, and an "Update Time" record 604. In FIG. 6, the number of successful communication connections and the received power value are used as communication quality index values, although only one of them may be used or one or more values different from them may also be used as a communication quality index value or values.

In the "Communication Position" record 601, point identification information is stored. This point identification information specifically identifies the individual points included in the map information that is stored in the master map information DB 316. As the point identification information, coordinates are used in this embodiment. These coordinates include the coordinates of the individual points on the travel route 60, and in addition, the coordinates of individual points at the loading site because, when the travel route is adaptively created at the loading site, the travel route changes as the excavators 10 move. When the current dump truck position information, travel permit request information and quality response signal are received from one of the dump trucks while the dump truck is traveling on the travel route 60, the communication quality information editing unit 311b updates the communication quality index value, which corresponds to the current position included in the received information, and the update time.

The "Communication Quality Index Value" record 602 is counted up by 1 when the current position information or travel permit request information is received from the dump truck 20. As the successful receipt of a quality response signal indicates that the communication of its corresponding quality-measuring signal and the quality response signal has succeeded, the "Number of Successful Communication connections" record 602 is counted up by 2. It is to be noted that the "Number of Successful Communication connections" record 602 is counted up by 2 for the same communication position because the time required for the transmission and receipt of the travel permit request information and travel permit response information is short (on the order of milliseconds) and the movement of the dump truck 20 during this time is hence neglible (the dump truck 20 is assumed to stay at the same point).

The "Received Power Value" record 603 can be indicated by the strength level of a radio wave from the base stations.

As a communication quality index value, the success rate of communication connections as calculated in accordance with the following formula (2) may be used.

$$E=\{(\Sigma\_est)/(\Sigma\_req)\}\times 100 \quad (2)$$

where $\Sigma\_est$: Total number of wireless communication connections between the fleet operations management server 31 and the dump truck 20-1 (equivalent to the number of successful communication connections), $\Sigma\_req$: Total number of requests for wireless communication kÿlinks from the fleet operations management server 31 or the dump truck 20-1, and E: Success rate of communication connections.

In the formula (2), the total number ($\Sigma\_req$) of requests for communication connections from the fleet operations management server 31 or the dump truck 20 may hardly be obtained as an accurate value in practice. If travel permit request information transmitted, for example, from the dump truck 20 does not reach any wireless base station, the wireless base stations 41 and fleet operations management server 31 cannot obtain any information that a wireless communication connections has been requested.

In the above-described situation, the probability of successful communication connections may be calculated by allowing the respective wireless base stations 41, the fleet operations management server 31 and the respective dump trucks 20 to write their transmission records in log information, respectively, consolidating these log information at a predetermined timing in the fleet operations management server 31, comparing transmission events and receipt events, and dividing the number of communication connections having mutually-corresponding transmission events and receipt events, in other words, the number of events having established communication sessions with the sum of the number of transmission events and the number of receipt events (said sum including only transmission events which occurred without their corresponding receipt events).

In FIG. 7, an example of a table of fleet operations management information, which the server manages, is illustrated. A communication management information 700 includes a "Dump Truck ID" record, a "Forward boundary Point Coordinates" record 702 of travel-permitted zones, a "Backward boundary Point Coordinates" record 703 of the travel-permitted zones, a "Travel Speed" record 704, a "Travel Direction" record 705, a "Current Position" record 706, and a "Current Position Receipt Time" record 707.

The "Forward boundary Point Coordinates" record 702 and "Backward boundary Point Coordinates" record 703 are information, which indicates travel-permitted zones granted to the respective dump trucks.

The "Travel Speed" record 704 indicates a travel speed set for each dump truck 20 in each travel-permitted zone.

The "Travel Direction" record 705 indicates in which one of forward and rearward directions each dump truck 20 is traveling in each travel-permitted zone.

In the "Current Position" record 706, position information periodically notified from the respective dump trucks 20 is stored.

In the "Current Position Receipt Time" record 707, times at which the server received current position information are stored. The fleet operations management server 31 uses the information for autonomous travel. By also applying the same information to the update processing of communication quality information, the management of communication quality information can be performed more adequately.

Figure 8A:
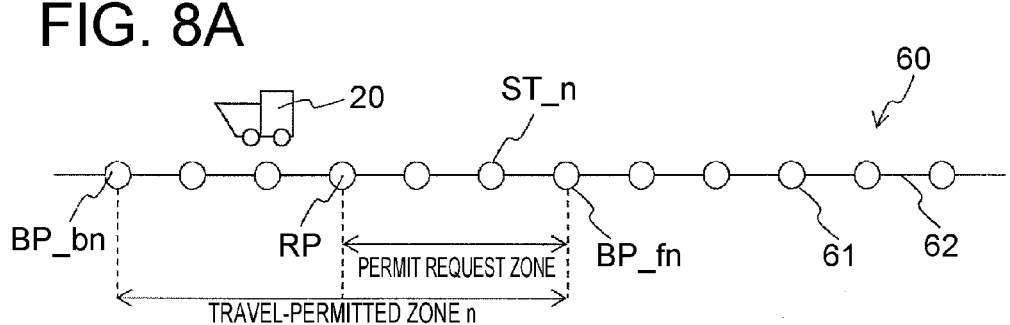
Figure 8B:
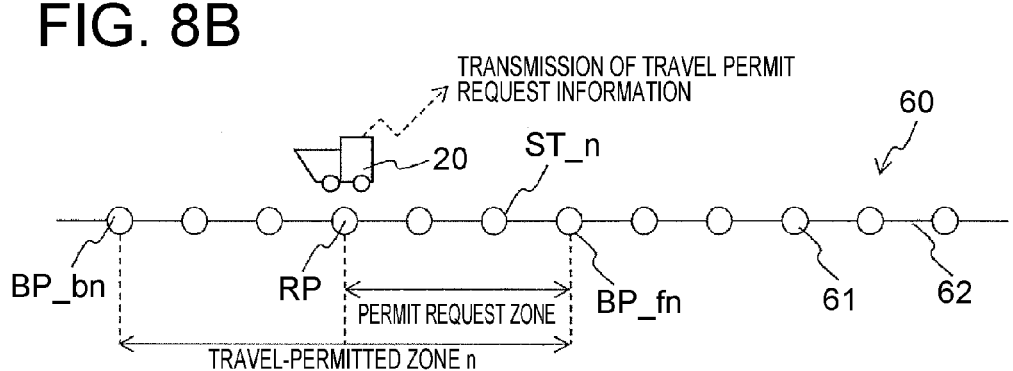
Figure 8C:
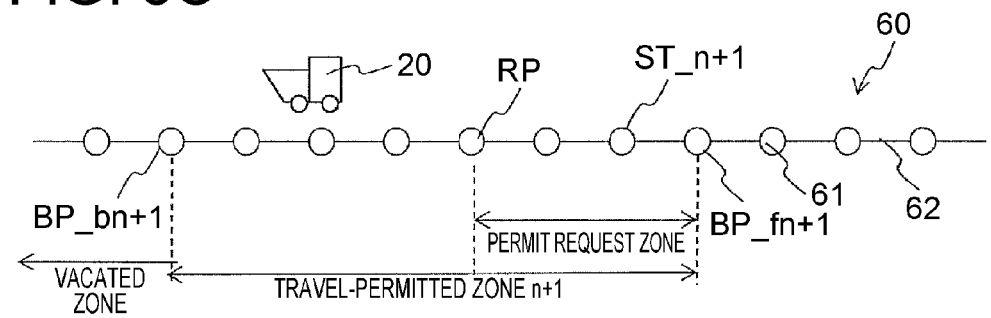

With reference to FIGS. 8A, 8B and 8C, a description will next be made about processing operation of autonomous travel. FIGS. 8A, 8B and 8C are diagrams illustrating setting processing of travel-permitted zones, in which FIG. 8A illustrates a state of a dump truck traveling in a travel-permitted zone n, FIG. 8B illustrates a state of the dump truck arrived at a permit request point, and FIG. 8C illustrates the state of setting of a next forward boundary point.

As illustrated in FIG. 8A, the travel route 60 is defined including nodes 61 and sublinks 62. FIG. 8A illustrates a travel-permitted zone n, which includes seven nodes 61 and six sublinks 62 connecting the adjacent nodes together. The travel-permitted zone n is defined by travel-permitted zone information (see numeral 412 in FIG. 4B) included in travel permit response information transmitted from the fleet operations management server 31 in response to travel permit request information which the dump truck 20 transmitted while traveling in an immediately-preceding, travel-permitted zone n–1 (the illustration of which is omitted).

In FIGS. 8A and 8B, a backward boundary point of the travel-permitted zone n is designated by BP_bn, while a forward boundary point of the travel-permitted zone n is designated by BP_fn. A permit request zone is defined to extend from the forward boundary point BP_fn as a reference point to the $4^{th}$ node rearward of the forward boundary point BP_fn as counted including the reference point. However, the manner of setting of the permit request zone is not limited to the foregoing, and the permit request zone may be set using the backward boundary point as a reference point. In the permit request zone, the node that is located rearmost is the point at which the dump truck 20 initiates the transmission of the travel permit request information, and will hereinafter be called "the permit request point" (indicated as "RP" in the drawings).

As illustrated in FIG. 8B, upon arrival at the permit request point RP, the dump truck 20-1 performs transmission of travel permit request information from the nearest wireless base station 41 to the fleet operations management server 31 via the wireless communication network 40 to request a next travel-permitted zone.

The node, which is located rearward by one node from the forward boundary point BP_fn, is a stop point ST_n. The dump truck 20 begins to transmit the travel permit request information from the permit request point RP, and stops its transmission if it cannot receive any travel permit response information upon arrival at the stop point ST_n. In this way, the dump truck 20 stops without traveling further beyond the forward boundary point BP_fn, and avoids any interference with a pre ceding vehicle.

Upon receipt of the travel permit request information, the fleet operations management server 31 performs setting processing of a vacated zone illustrated in FIG. 8C. The term "vacated zone" means a zone, which the fleet operations management server 31 set as a travel-permitted zone responsive to a preceding travel permit request and has then vacated to permit granting a travel permit to another dump truck. The fleet operations management server 31 sets, as a vacated zone, a side more rear by a predetermined distance than the node at which the dump truck 20 transmitted the permit request information.

The fleet operations management server 31 next sets a new travel-permitted zone. The fleet operations management server 31 sets a backward boundary point BP_bn+1 of the new travel-permitted zone n+1 as a most forward node in a vacated zone. The fleet operations management server 31 also sets a node, which is at a greatest distance settable as a travel-permitted zone (if there is a preceding vehicle, which is a most forward end of a vacated zone set behind the vehicle), as a forward boundary point BP_fn+1. In this manner, the travel-permitted zone setting unit 311a sets, as the travel-permitted zone n+1, plural ones of segments of a section of the travel route 60, which section extends from the forward boundary point BP_fn+1 to the backward boundary point BP_bn+1. Repetition of the above-described processing inhibits the dump truck 20 from entering any zone to which no travel permit has been granted, whereby a collision with another dump truck can be prevented.

Figure 9:
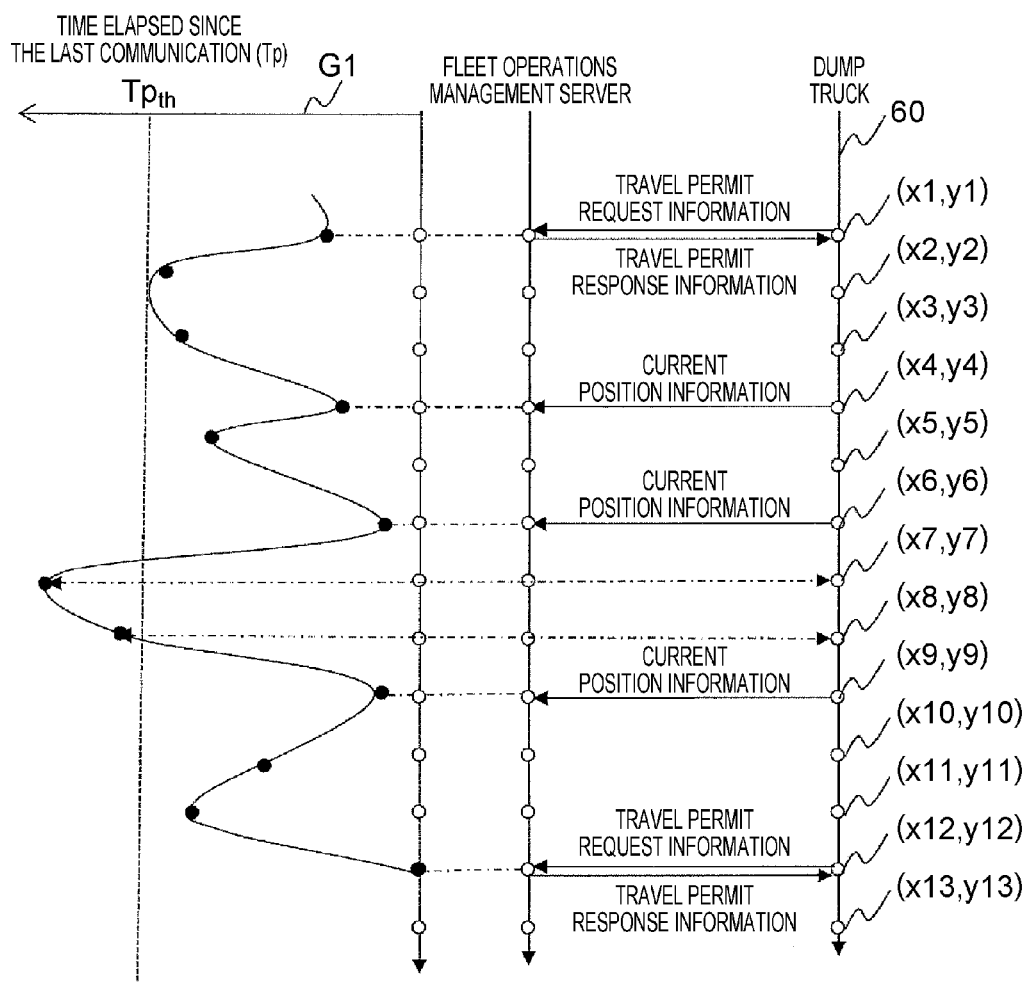
FIG. 9 illustrates examples of communication between the fleet operations management server and the dump truck and an example of an update timing graph at that time.
Figure 10:
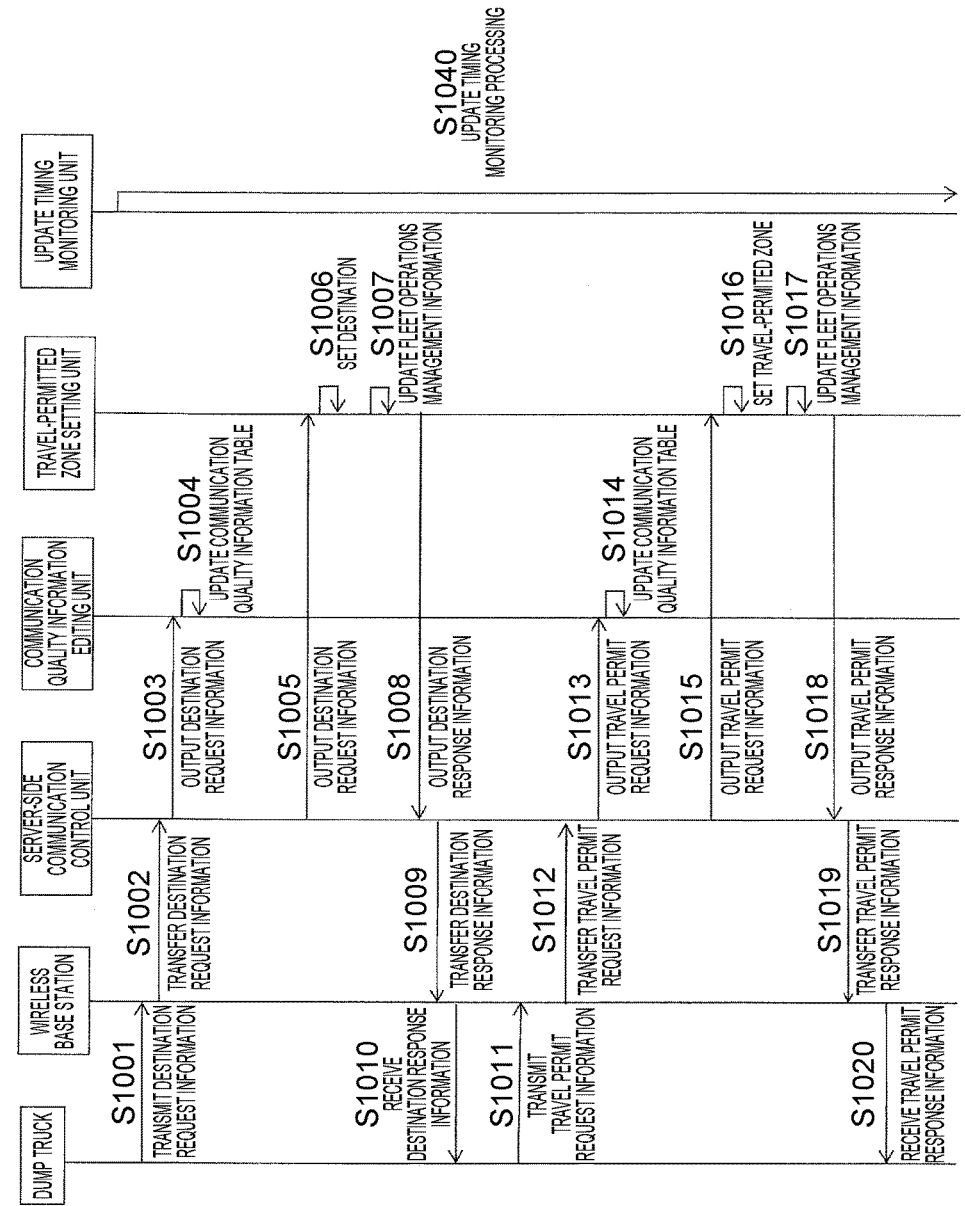
FIG. 10 is a sequence diagram illustrating operations from the transmission of destination setting request information to the receipt of travel permit response information in the sequence of communication in the wireless system.
Figure 11:
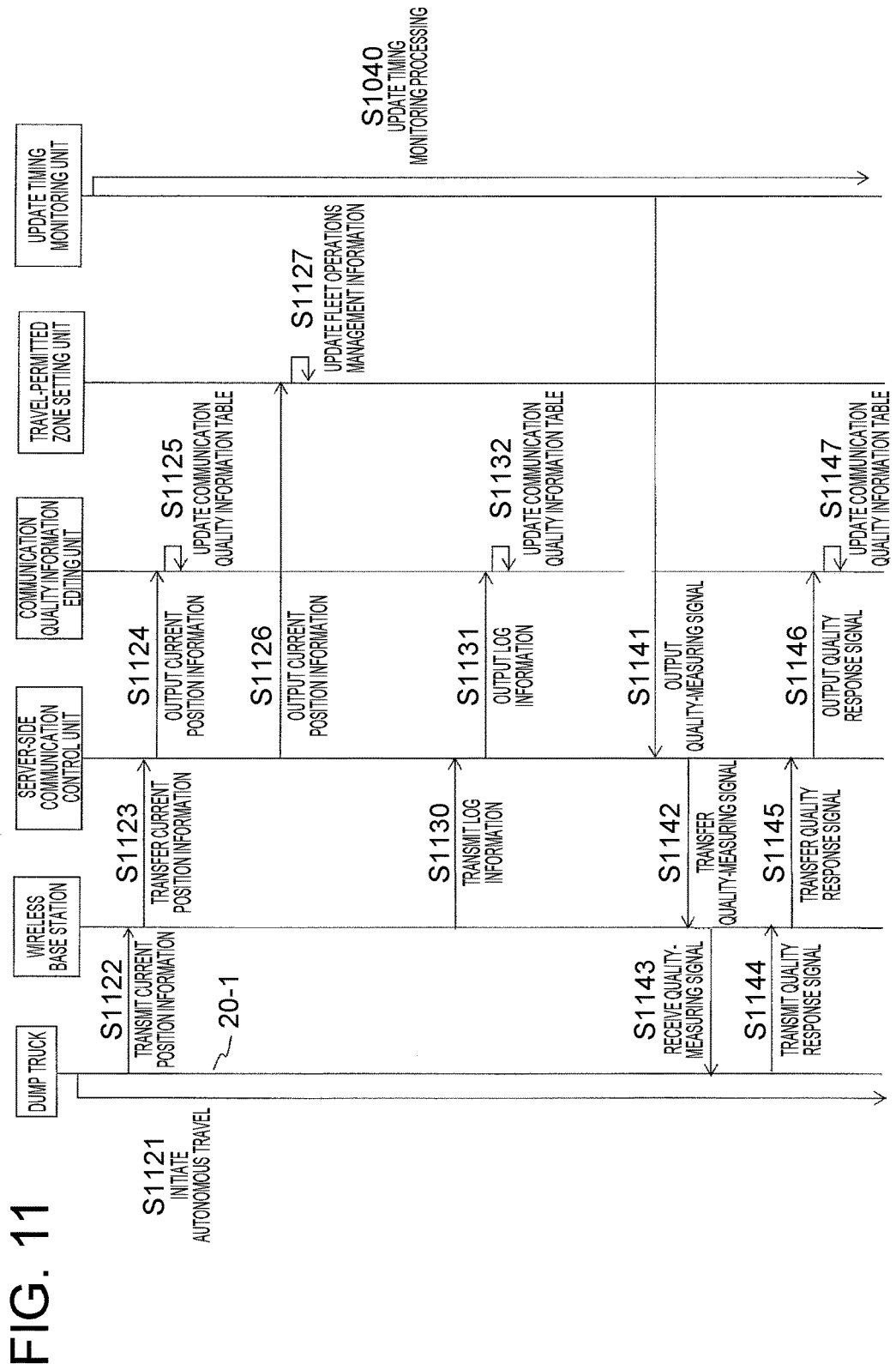
FIG. 11 is a sequence diagram illustrating operations from the initiation of an autonomous travel in the sequence of communication in the wireless system.
Figure 12:
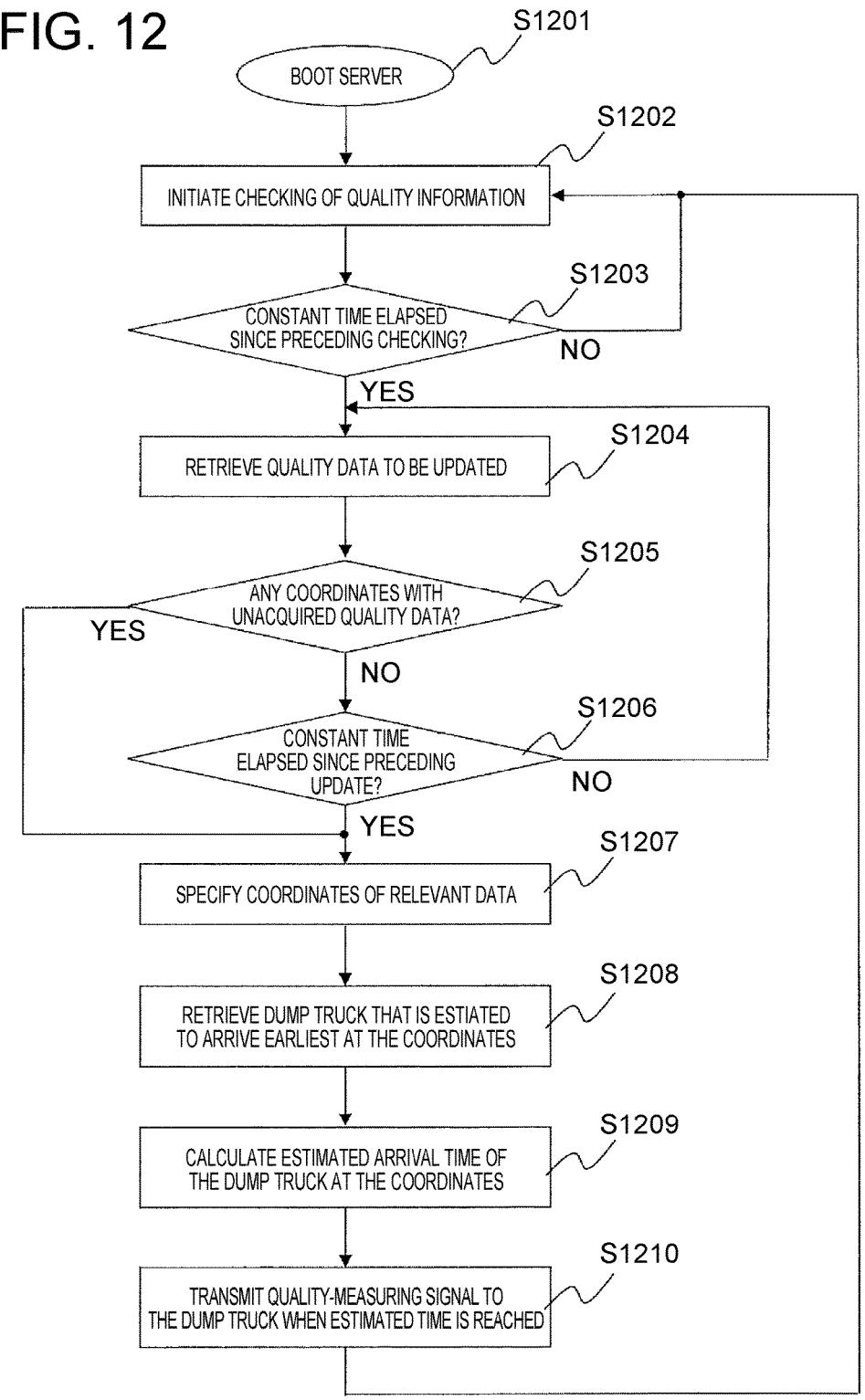
FIG. 12 is a flow chart illustrating the flow of update timing monitoring processing.

Referring to FIG. 9 through FIG. 12, a description will next be made about the flow of operation of the wireless system according to this embodiment. FIG. 9 illustrates examples of communication between the fleet operations management server and the dump truck and an example of update timing graph at that time. FIG. 10 is a sequence diagram illustrating operations from the transmission of destination setting request information to the receipt of travel permit response information in the sequence of communication in the wireless system. FIG. 11 is a sequence diagram illustrating operations from the initiation of an autonomous travel in the sequence of communication in the wireless system. FIG. 12 is a flowchart illustrating the flow of update timing monitoring processing.

In FIG. 9, (x,y)s indicate points on the travel route 60. These points are not limited to a case where they register with nodes, but may indicate points on sublinks or desired points in the loading site.

As described with reference to FIG. 9, the dump truck 20 transmits travel permit request information to the fleet operations management server 31 when it has approached an end part of a travel-permitted zone and has reached a permit request point (x1,y1). Responsive to the travel permit request information, the fleet operations management server 31 transmits travel permit response information, and the dump truck 20 receives the travel permit response information. Therefore, a timing at which a communication relating to a travel permit occurs varies at random according to the length of the travel-permitted zone and the traveling state of the dump truck.

The dump truck also performs communication to periodically notify the positions, through which the own vehicle is currently traveling, to the fleet operations management server. In FIG. 9, the current position information is transmitted at coordinates (x4,y4), (x6,y6) and (x9,y9) to the fleet operations management server 31. The coordinates (x4, y4), (x6, y6) and (x9,y9) are not located at equal intervals, because the speed of the dump truck 20 varies and the intervals of transmission points of current position information do not become constant for the variations in travel speed even when the intervals of transmission times of the current position information are constant. The communication of the current position information and the communication of travel permit request information and travel permit response information occur at mutually independent timings.

Although plural dump trucks 20 are traveling in the whole mine, the individual dump trucks 20 are not needed to take synchronization or the like of communication timings, and perform these communication at independent timings. When communication is conducted as described above, the whole area may divide into a place where communication occurs frequently and another place where communication do not occur often. In such a situation, deviations arise in the update frequency of communication quality information. These deviations in the update frequency will be described with reference to an update timing graph G1 (hereinafter abbreviated as "the graph G1") of FIG. 1.

The graph G1 illustrates details of an update of communication quality index values at each point, and is equivalent to an update timing image. In the graph G1, sampling points that indicate the times of update of the communication quality information at the individual coordinates have been interpolated by a spline curve. The deviations in the update frequency can, however, be indicated by only a row of points of the sampling points. The display control unit 311f may be configured to display the graph G1 or the row of points of the sampling points of FIG. 9 on the screen of the server-side display device 313, and to modify he update frequency to the user. However, the update frequency and the communication quality information are different from each other, so that the user cannot determine the level of communication quality if the user simply takes a look at the update frequency.

The graph G1 of FIG. 1 a illustrates times elapsed since communication were made lastly at the individual points. Elapsed times Tp at the coordinates (x7,y7), (x8,y8) exceed a time threshold level $T_{th}$ that indicates the tolerance of elapsed time. Therefore, the communication quality information at the coordinates (x7,y7),(x8,y8) is old, and does not necessarily reflect the current communication quality. Especially in a mine, the terrain changes with the progress of digging work by the excavators 10, and therefore, the conditions of radio waves change. It is, thus, necessary to specify points of poor radio wave conditions and to improve the poor radio wave conditions by making the elapsed times since the last update of communication quality fall within a predetermined range (the time threshold level $T_{th}$) and grasping the levels of communication quality (the conditions of radio waves) that reflect the current conditions as much as possible. In this manner, it is possible to prevent autonomously-traveling dump trucks from stopping due to communication errors and to contribute to improvements in the productivity of the mine. It is, therefore, an object of this embodiment to monitor the occurrence of an area of communication quality information which may be old and may hence be different from the current conditions.

Referring to FIG. 10 and FIG. 11, a description will next be made of the sequence of processing operations by individual communication node equipment according to this embodiment.

It is assumed that upon staring the processing of FIG. 10, the dump truck 20 is in a stopped state and the main power supplies of the wireless base stations 41 and fleet operations management server 31 are ON.

Each dump truck 20 cannot travel in a state that a next destination has not been set yet. In a state that the travel control unit 261a does not have any travel-permitted zone information, that is, while the dump truck 20 remains stopping, for example, at the loading site or the dumping site, the request information processing unit 261c transmits destination request information is transmitted to the fleet operations management server 31 to request a destination (S1001).

Here, the destination request information is received by the wireless base station 41 that is closest to the dump truck 20. The wireless base station 41 writes the receipt record of the destination request information together with the date and time of its receipt in the log information. The writing in the log information is conducted whenever an event (the reception or transmission of data) occurs at each wireless base station 41.

The destination request information is relayed from the wireless base station 41 to the fleet operations management server 31 (S1002).

The server-side communication control unit 311c receives the destination request information, and transmits it to the communication quality information editing unit 311b (S1003). The communication quality information editing unit 311b performs update of the communication quality information table (S1004). Specifically, the communication quality information editing unit 311b increments, by 1, the value of the "Number of Successful Communication connections" record 602 in the "Communication Position" record 601 which corresponds to the current position information included in the destination request information. Further, the communication quality information editing unit 311b updates the values of the "Received Power Value" record 603 and "Update Time" record 604.

Further, the server-side communication control unit 311c receives the destination request information, and outputs it to the travel-permitted zone setting unit 311a (S1005). With reference to the current position information of the dump truck 20-1 and the map information in the master map information DB 316, the travel-permitted zone setting unit 311a determines the destination, and produces destination response information that indicates its contents (S1006). Further, the travel-permitted zone setting unit 311a records the destination of the dump truck 20-1 in the fleet operations management information (S1007). The travel-permitted zone setting unit 311a conducted the setting of the destination in this embodiment, but a module (dispatch management unit), which is different from the travel-permitted zone setting unit 311a and performs only the setting of destinations, may be provided.

The travel-permitted zone setting unit 311a outputs the destination response information to the server-side communication control unit 311d (S1008).

The server-side communication control unit 311d returns the destination response information to the dump truck 20 via the wireless base station 41 (S1009,S1010).

Upon receipt of the destination response information, the request information processing unit 261c transmits, to the fleet operations management server 31, travel permit request information (including current position information) to request the setting of a travel-permitted zone (S1011).

The travel permit request information is relayed from the wireless base station 41 to the fleet operations management server 31 (S1012).

The server-side communication control unit 311c outputs the travel permit request information to the communication quality information editing unit 311b (S1013), and the communication quality information editing unit 311b updates the communication quality information table (S1014). The updated contents at this time are similar to those in step S1004.

The server-side communication control unit 311c outputs the travel permit request information to the communication quality information editing unit 311b (S1015), and with reference to the current position information of the dump truck 20 and the map information in the master map information DB 316, the travel-permitted zone setting unit 311a sets a travel-permitted zone (S1016), produces travel permit response information indicating the contents of the travel-permitted zone, and records travel permit fleet operations management information, which has been set for the dump truck 20, in the fleet operations management information in the fleet operations management information DB 318 (S1017).

The travel-permitted zone setting unit 311a outputs the travel permit response information to the server-side communication control unit 311d (S1018).

The server-side communication control unit 311d returns the travel permit response information to the dump truck 20-1 via the wireless base station 41 (S1019,S1020).

The terminal-side communication control device 261 of the dump truck 20-1 receives the travel permit response information, and outputs it to the travel control unit 261a. The travel control unit 261a performs control on the travel control device 267 so that the dump truck 201 autonomously travels along the travel-permitted route set as described above. As a result, the dump truck 20-1 initiates an autonomous travel (S1121; see FIG. 21).

The dump truck 20 transmits current position information of the own vehicle, which the position calculating device 269 has periodically calculated during the autonomous travel, to the fleet operations management server 31 (S1122). The wireless base station 41 receives the current position information of the dump truck 20, and relays it to the fleet operations management server 31 (S1123).

The server-side communication unit 311d outputs the current position information to the communication quality information editing unit 311b (S1124), and the communication quality information table is updated (S1125).

Further, the server-side communication control unit 311d outputs the current position information to the travel-permitted zone setting unit 311a (S1126), and the fleet operations management information is updated (S1127).

Independently from the fleet operations processing for the dump truck 20, the wireless base station 41 periodically transmits the log information to the fleet operations management server 31 (S1130). The server-side communication control unit 311d receives the log information, and outputs it to the communication quality information editing unit 311b (S1131).

The communication quality information editing unit 311b updates the communication quality information table (see FIG. 6) on the basis of the log information so received (S1132). Respective communication nodes (the respective dump trucks 20 and wireless base stations 41) may independently collect logs and may transmit them from the respective communication nodes to the fleet operations management server 31. The respective communication nodes may transmit these logs at mutually-independent timings. In this case, the communication quality information editing unit 311b selects only the logs the communication dates and times of which are the latest, and updates the communication quality information table.

FIG. 11 describes, for the sake of convenience of description, only the transmission of log information after the step S1120 and the update processing of the communication quality information by the log information, and the processing in S1130 to S1133 is executed at desired timings independently from the setting processing of the travel-permitted zone.

With reference to the communication quality information, the update timing monitoring unit 311c performs update timing monitoring processing at a timing independently from the setting processing of the travel-permitted zone, the log collection and update processing (S1140). Its details will be described subsequently herein.

When an update target point has been specified as a result of the processing in step 1140, the update timing monitoring unit 311c specifies the dump truck as a target vehicle, and transmits a quality-measuring signal (S1141,S1142,S1143). The dump truck, which has received the quality-measuring signal, transits a quality response signal to the fleet operations management server 31 (S1144,S1145).

The server-side communication control unit 311d outputs the current position information to the communication quality information editing unit 311b (S1146), and the communication quality information table is updated (S1147).

For the sake of convenience of description, only single first update timing monitoring processing is described in FIG. 11. However, the update timing monitoring unit 311c may execute the update timing monitoring processing continuously, or may execute it at predetermined time intervals. Referring to FIG. 12, a description will hereinafter be made about the flow of the update timing monitoring processing in step S1140. FIG. 12 is a flow chart illustrating the flow of the update timing monitoring processing.

Subsequent to booting of the fleet operations management server 31 (S1201), the update timing monitoring unit 311c initiates checking of the communication quality information (S1202). Check times are recorded. If a constant time has elapsed since the preceding checking (S1203/Yes), a retrieval for a point (coordinates) that need an update is initiated (S1204). If the constant time has not elapsed yet since the preceding checking (S1203/No), the processing is allowed to stand by.

As an example of a point (coordinates) that need an update, a retrieval is first made for a point where no communication quality information has been acquired yet (is missing). If there are any missing coordinates (S1205/Yes), this point is specified as an update target with respect to the communication quality information (S1207).

As another example of the point (coordinates) that need an update, a point—at which the constant time has elapsed since the preceding update, in other words, the elapsed time since the preceding update has exceeded the time threshold level $Tp_{th}$ (S1205/No, S1206/Yes)—is also specified as an update target with respect to the communication quality information (S1207).

If there is not any point that needs an update (S1206/No), the processing returns to step S1204 and the retrieval for a point that needs an update is continued.

If there is a point that needs an update, the update timing monitoring unit 311c makes a retrieval, on the basis of the fleet operations management information in the fleet operations management information DB 318, for a dump truck (equivalent to a target vehicle) that would arrive earliest at the specified coordinates (S1208).

The update timing monitoring unit 311c then calculates the estimated arrival time of the dump truck that would arrive earliest at the coordinates (x7,y7) of the update target point (S1208).

When the estimated arrival time is reached, the fleet operations management server 31 transmits a quality-measuring signal to the specified dump truck (S1210). This transmission of the quality-measuring signal corresponds to the communication trigger processing in the first embodiment. Subsequently, the processing returns to step S1201, and this series of processing is repeated. As communication can be made to each area that needs an update of the communication quality information by the update timing monitoring processing, the entire communication quality information can be managed without omission. Strictly speaking, however, a time lag arises between the estimate arrival time calculated in step 1210 and the time of transmission of the quality response signal when the quality-measuring signal is transmitted at the estimated arrival time from the fleet operations management server 31 and the dump truck 20 receives the quality-measuring signal and transmits the quality response signal. Nonetheless, this time lag is attributable to a communicative time lag and also to the processing time at the on-board terminal equipment 26 of the dump truck 20, and falls within an order of from several milliseconds to several seconds. Accordingly, the positional offset from the update target point to the actual position of the dump truck 20 during the time lag is of such an extent as the quality response signal can be considered to have been transmitted at the update target point. In this embodiment, upon transmission of the quality-measuring signal at the estimated arrival time, the processing is, therefore, performed under the assumption that the quality response signal has been acquired from the update target point, even if the exact position of the dump truck 20 is offset from the update target point. The update timing monitoring unit 311c may also be configured to transmit the quality-measuring signal earlier by the time lag than the estimated arrival time in anticipation of the occurrence of the time lag.

Figure 13:
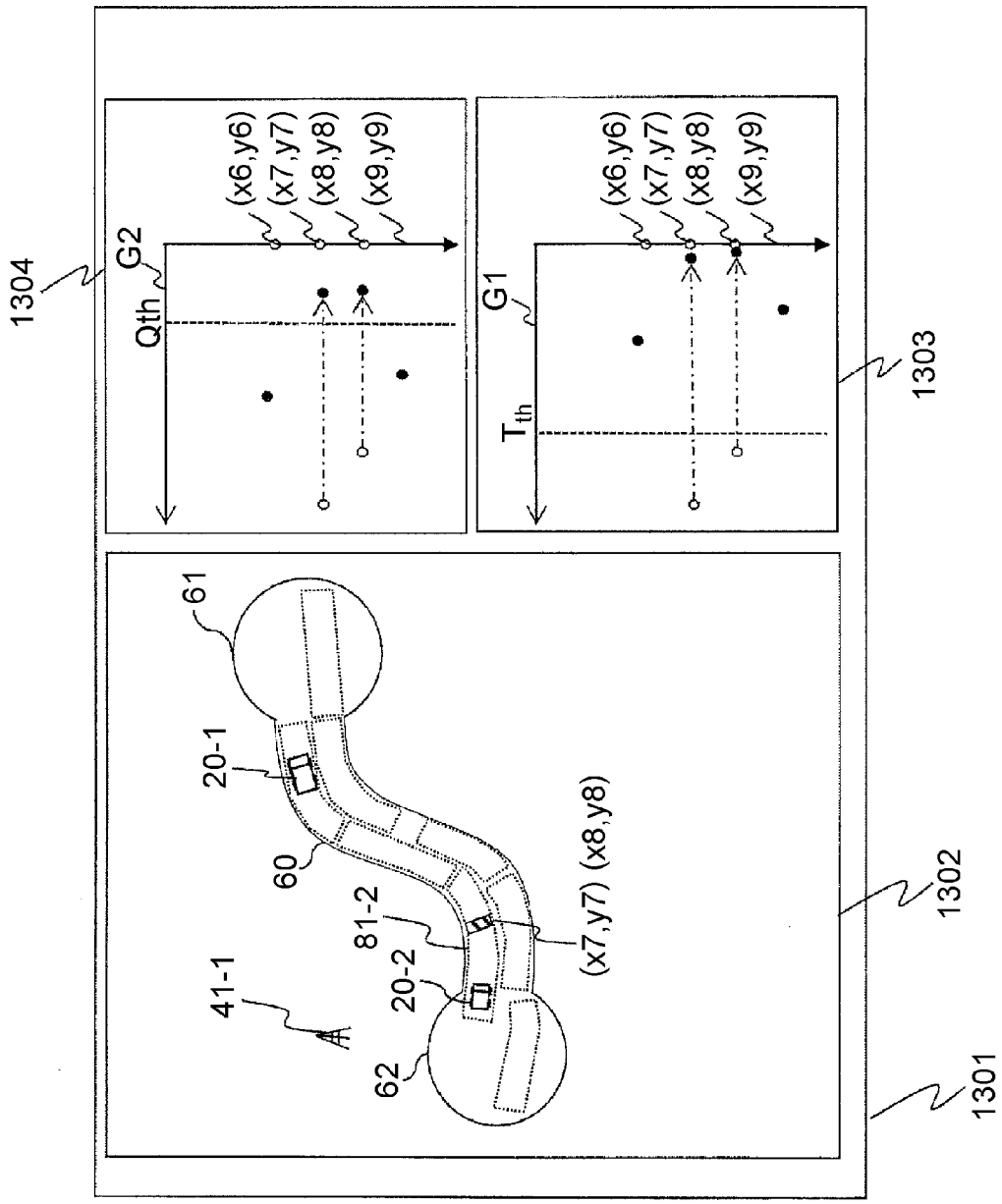
FIG. 13 is a diagram illustrating an example of screen display in the first embodiment.

Referring to FIG. 13, a description will now be made about an example of screen display in this embodiment. FIG. 13 is a diagram illustrating the example of screen display in the first embodiment. In the example of FIG. 13, a map image 1302, an update timing image 1303 and a communication quality image 1304 are displayed on a screen 1301 of the server-side display device 313. In the map image 1302, update target points are displayed in superimposition on the travel route along which the dump trucks 20 travel. In superimposition on the map image 1302, a travel-permitted zone may also be displayed further. In this case, the display control unit 311f reads the map information from the master map information DB 316, superimposes, on the map information, the travel-permitted zone specified in the fleet operations management information in the fleet operations management information DB 318 to create the map image 1302, and outputs the map image 1302 to the server-side display device 313. As the respective images 1303, 1304, the display control unit 311f reads the quality information in the communication quality information DB 317, creates the update timing graph (G1) and a communication quality graph (G2), and outputs them to the server-side display device 313. The communication quality graph (G2) shows communication quality index values at the respective points, and is equivalent to the communication quality image.

In FIG. 13, the coordinates (x7,y7),(x8,y8), as targets where the quality information is to be updated, are included in a travel-permitted zone 81-2 granted to the dump truck 20-2. The display control unit 311f displays the positions, which correspond to the coordinates (x7, y7), (x8, y8), respectively, in a display mode different from the coordinates that would not become update targets. In addition, the display control unit 311f also displays, on the map image 1302, the wireless base station 41-1 located near the coordinates (x7,y7),(x8,y8) as targets to be updated.

In the image 1303, the coordinates (x7,y7),(x8,y8) are indicated to have elapsed beyond the time threshold level $T_{th}$ since the preceding update. When quality-measuring signals are transmitted and received, the elapsed times and quality levels at the coordinates (x7,y7),(x8,y8) in the images 1303, 1308 change from unfilled circles before the measurement to filled circles after the measurement. A quality threshold level $Q_{th}$ in the communication quality graph (G2) is a value of communication quality for determining the level of communication quality. The communication quality levels at the coordinates (x7,y7), (x8,y8) are corrected downward before and after the transmission and reception of the quality-measuring signals and are displayed below the quality threshold level $Q_{th}$, whereby the user can grasp that the communication quality levels at the point were inferior. Owing to the foregoing, the user can determine, for example, whether or not a movement of the wireless control station 41-1 is needed, and can take a measure to improve the communication quality.

By the series of processing described above, the fleet operations management server 31 can manage amine area so that the communication quality information of the entire mine area can be maintained in the latest state without developing such a situation that the communication quality information has not been acquired or is old. At the same time, it is possible to obviate the labor that would otherwise be needed to make measurements for the above-mentioned management by additionally using a mobile survey vehicle. The state of communication quality information can, therefore, be managed well without affecting the operation of the mine.

Second Embodiment

Figure 14:
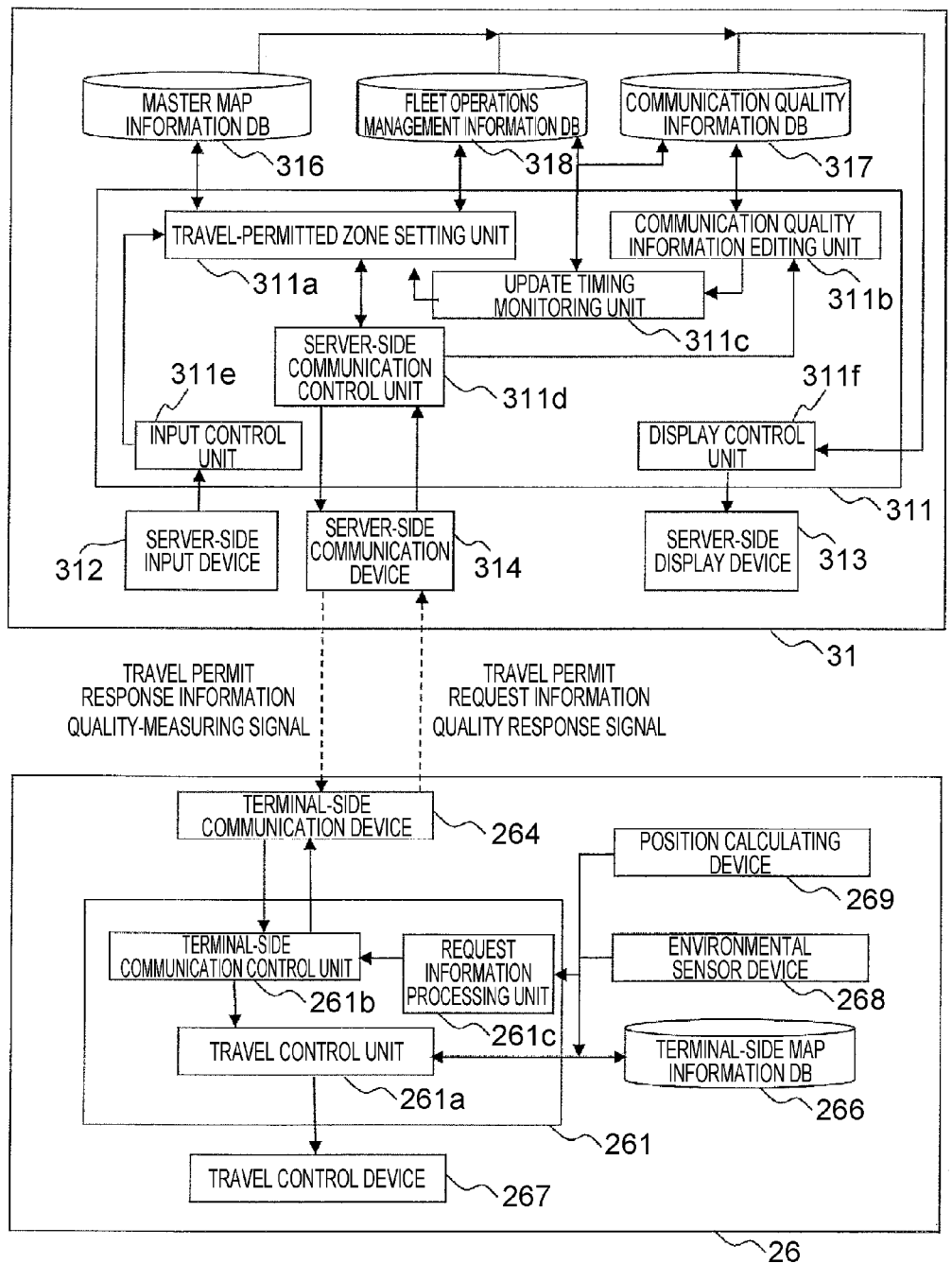
FIG. 14 is a functional block diagram showing main functions of a fleet operations management server and on-board terminal equipment in a second embodiment.
Figure 15:
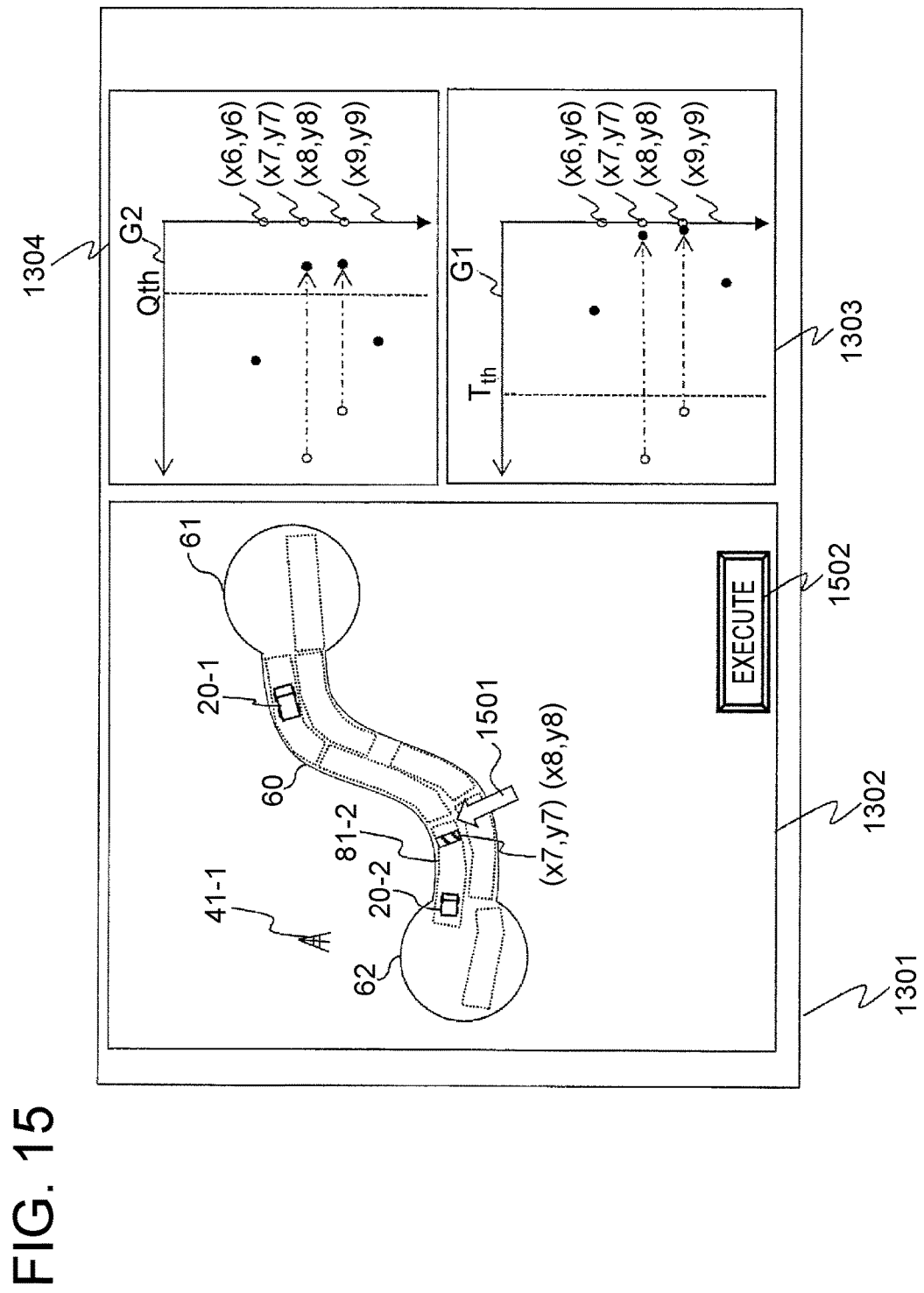
FIG. 15 is a diagram illustrating an example of screen display in the second embodiment.

The second embodiment outputs an update target point to the travel-permitted zone setting unit 311a, and conducts the setting processing of a travel-permitted zone so that the update target point registers with a permit request point. In this case, the output of the update target point to the travel-permitted zone setting unit 311a corresponds to communication trigger processing. With reference to FIGS. 14 and 15, a description will hereinafter be made about the second embodiment. FIG. 14 is a functional block diagram showing main functions of a fleet operations management server and on-board terminal equipment in the second embodiment. FIG. 15 is an example of screen display in the second embodiment.

As illustrated in FIG. 14, upon specification of coordinates (update target point) that needs the measurement of communication quality by the update timing monitoring unit 311c, the update timing monitoring unit 311c outputs the coordinates to the travel-permitted zone setting unit 311a. The travel-permitted zone setting unit 311a sets a travel-permitted zone or changes the preceding travel-permitted zone so that the coordinates become a permit request point, and transmits the permit request point as travel permit response information.

As an alternative, the user may set a travel-permitted zone or may change the preceding travel-permitted zone so that the coordinates become a permit request point. As illustrated, for example, in FIG. 15, in the map image 1302 that shows a travel-permitted zone, the forward boundary point of the travel-permitted zone in which the update target point is included may be changed with a mouse cursor 1501 so that the update target point becomes the permit request point. When the user performs position-changing operation of the forward boundary point with the server-side input device 312 and operation of an execution button 1502, the input control unit 311e outputs the contents of the operations to the travel-permitted zone setting unit 311a. The travel-permitted zone setting unit 311a then update the fleet operations management information in the fleet operations management information DB 318 according to the contents of the operations.

According to this embodiment, it is possible to perform the collection of communication quality without using quality-measuring signals. It is, therefore, possible to decrease the amount of communication through the wireless communication network by the transmission and receipt of quality-measuring signals, and therefore, to lower the communication load.

The above-described respective embodiments are illustrative for describing the present invention, and are not intended to limit the scope of the present invention to the above-described embodiments. Those skilled in the art can practice the present invention in various other modes to an extent not departing from the spirit of the present invention.

For example, the update timing monitoring unit in the above-described embodiments determined, through a comparison between the elapsed time from the time of the preceding update and the time threshold level, if the conditions of collection of communication quality had deteriorated (had became old). As the condition for determining a deterioration of the updated state, it is possible to determine if the number of samples for calculating the communication quality index value at the point satisfies a specified number. When the success rate of communication connections (number of successful communication connections/total number of communication attempts) is used as a communication quality index value, for example, it is possible to use, as an update target point, a point where the number of samples as a parameter, said number corresponding to the total number of communication attempts, falls below the specified number.

It is also possible to use, as the above-described condition, if the mean, mode or median of received power values rather than the latest value of received power values is, as a communication quality index value, equal to or greater than a power threshold value for determining the level of the strength of radio waves. Here again, it is possible to use, as a condition for determining a deterioration in an undated state, if the number of samples for calculating the mean, mode or median satisfies the specified value.

Upon specifying a target vehicle, the update timing monitoring unit may specify, as the target vehicle, a dump truck, which is traveling on a side nearer in the advancing direction than an update target point in a travel-permitted zone, without calculating the estimated arrival times of the respective dump trucks when the travel-permitted zone including the update target point has been set. If a travel-permitted zone has not been set including an update target point or if a dump truck, which is traveling in the travel-permitted zone, has passed through the update target point even when the travel-permitted zone including the update target point has been set, it is possible to specify, as a target vehicle, another dump truck which is traveling in a travel-permitted zone set at the closed position on a side nearer than the update target point.

In the foregoing, the description was made using haulage vehicles. The haulage vehicles are, however, not limited to autonomously-traveling haulage vehicles, and the present invention can also be applied to a wireless system when a so-called manned dump truck, which is driven by an operator riding thereon, performs a wireless communication.

LEGENDS

1 Vehicle travel system (wireless system)
10,10-1,10-2 Excavators
20,20-1,20-2 Dump trucks
31 Fleet operations management server
40 Wireless communication network
41-1,41-2,41-3 Wireless base stations
60 Travel route

The invention claimed is:

1. A wireless system for communicably connecting plural haulage vehicles, which travel in a mine, and a fleet operations management server, which manages operation of the respective haulage vehicles, together via a wireless communication network, wherein:
the haulage vehicles each comprise:
position calculating equipment that calculates a position of an own vehicle of the haulage vehicle, and
a terminal-side communication control unit that performs control to conduct a wireless communication with the fleet operations management server;
the fleet operations management server comprises:
a server-side communication control unit that performs control to conduct a wireless communication with each haulage vehicle,
a fleet operations management information storage unit that stores fleet operations management information including the position of the own vehicle of each haulage vehicle as received from the haulage vehicle,
a communication quality information editing unit that performs edition of communication quality information, in which point identification information specifically identifying individual points in the mine, communication quality index values indicating quality levels of conditions of connections to the wireless communication network at the points, and update times indicating times at which the communication quality index values were updated lastly, are associated with each other, and
an update timing monitoring unit that specifies, each one of the points, at which one point the communication quality index value does not satisfy a condition for allowing to consider the communication quality index value to be a communication quality index value at a current time, as an update target point and performs communication trigger processing to trigger communication for newly acquiring a communication quality index value of the update target point;
the update timing monitoring unit specifies one of the haulage vehicles, which one haulage vehicle is planned to travel through the update target point, as a target vehicle on a basis of the fleet operations management information, calculates an estimated arrival time at which the target vehicle would arrive at the update target point, and performs processing to make the target vehicle conduct transmission of wireless data as the communication trigger processing at the estimated arrival time;
the terminal-side communication control unit of the target vehicle performs the transmission of the wireless data, which includes the position of the own vehicle, to the fleet operations management server at the estimated arrival time; and
the communication quality information editing unit updates the communication quality information on a basis of the wireless data received.

2. The wireless system according to claim 1, wherein:
the update timing monitoring unit uses, as the condition, at least one of that a time elapsed from the update time is less than a time threshold level for determining whether the communication quality index value is new or old, that a sampling number of communication quality index values at the update target point is equal to or greater than a specified number of times set beforehand to ensure effectiveness of the communication quality index value, and that none of the communication quality index values are missing.

3. The wireless system according to claim 1, wherein:
the update timing monitoring unit transmits, as the communication trigger processing, a quality-measuring signal, which is for measuring communication quality, to the target vehicle at the estimated arrival time; and
the terminal-side communication control unit of the target vehicle returns, to the fleet operations management server, a quality response signal indicating that the quality-measuring signal has been received.

4. The wireless system according to claim 3, wherein:
the quality-measuring signal includes signal identification information that can specifically identify the quality-measuring signal, and the quality response signal includes signal identification information of the quality-measuring signal to be responded.

5. The wireless system according to claim 1, wherein:
the fleet operations management server further comprises a travel-permitted zone setting unit that sets, for each haulage vehicle, at least one of segments of a section of a preset travel route in the mine as a travel-permitted zone in which the haulage vehicle is permitted to travel;
each haulage vehicle further comprises a request information processing unit that produces travel permit request information to request the fleet operations management server to set and grant a new travel-permitted zone, and
a travel control unit that allows each haulage vehicle to autonomously travel according to the travel-permitted zone received from the fleet operations management server;
the terminal-side communication control unit transmits the travel permit request information when each haulage vehicle has reached a permit request point located on a side nearer by a permit request distance, which has been set in view of a stoppable distance of the own vehicle, from an end part of the travel-permitted zone granted to the own vehicle;

the update timing monitoring unit outputs the update target point to the travel-permitted zone setting unit; and the travel-permitted zone setting unit sets the travel-permitted zone so that the permit request point registers with the update target point.

6. The wireless system according to claim 1, wherein:

the fleet operations management server further comprises a travel-permitted zone setting unit that sets, for each haulage vehicle, at least one of segments of a section of a preset travel route in the mine as a travel-permitted zone in which the haulage vehicle is permitted to travel; and the update timing monitoring unit specifies one of the haulage vehicles, which one haulage vehicle is traveling on a side nearer in an advancing direction than the update target point in the travel-permitted zone, as the target vehicle when the travel-permitted zone with the update target point included therein has been set, or specifies one of the haulage vehicles, which one haulage vehicle is traveling in a travel-permitted zone set at a closest position on a side nearer than the update target point when the travel-permitted zone with the update target point included therein has not been set yet or when the haulage vehicle, which is traveling in the travel-permitted zone, has passed through the update target point even if the travel-permitted zone with the update target point included therein has been set.

7. The wireless system according to claim 1, wherein:

the update timing monitoring unit calculates the estimated arrival times of the respective haulage vehicles, and specifies one of the haulage vehicles, which one haulage vehicle indicates fastest one of the estimated arrival times, as the target vehicle.

8. The wireless system according to claim 7, wherein:

the update timing monitoring unit calculates the estimated arrival time of each haulage vehicle in accordance with the following formula (1):

$$t=t_0+(P_1-P_0)\div V_0 \qquad (1)$$

where t: time of arrival at the update target point
$t_0$: current time
$P_0$: current position of the haulage vehicle
$P_1$: position of the update target point
$V_0$: travel speed of the haulage vehicle.

9. The wireless system according to claim 8, wherein:

the fleet operations management information includes vehicle identification information that specifically identifies the respective haulage vehicles, the current positions of the respective haulage vehicles, the update times of the current positions, the travel speeds and travel directions of the respective haulage vehicles, and information indicating travel-permitted zones granted to the respective haulage vehicles; and the update timing monitoring unit calculates the estimated arrival time of each haulage vehicle with reference to the fleet operations management information.

10. A fleet operations management server for being communicably connected to plural haulage vehicles, which travel in a mine, respectively, via a wireless communication network, comprising:

a server-side communication control unit that performs control to conduct wireless communication with each haulage vehicle, a fleet operations management information storage unit that stores fleet operations management information including a position of an own vehicle of each haulage vehicle as received from the haulage vehicle, a communication quality information editing unit that performs edition of communication quality information, in which point identification information specifically identifying individual points in the mine, communication quality index values indicating quality levels of conditions of connections to the wireless communication network at the points, and update times indicating times at which the communication quality index values were updated lastly, are associated with each other, and an update timing monitoring unit that specifies, each one of the points, at which one point the communication quality index value does not satisfy a condition for allowing to consider the communication quality index value to be a communication quality index value at a current time, as an update target point and performs communication trigger processing to trigger communication for newly acquiring a communication quality index value of the update target point;

the update timing monitoring unit specifies one of the haulage vehicles, which one haulage vehicle is planned to travel through the update target point, as a target vehicle on a basis of the fleet operations management information, calculates an estimated arrival time at which the target vehicle would arrive at the update target point, and performs processing to make the target vehicle conduct transmission of wireless data as the communication trigger processing at the estimated arrival time;

the server-side communication control unit receives wireless data, which includes the position of the own vehicle, from the target vehicle at the estimated arrival time; and the communication quality information editing unit updates the communication quality information on a basis of the wireless data received.

11. The fleet operations management server according to claim 10, further comprising:

a display unit that produces and displays at least one of an update timing image which on a basis of the communication quality information, indicates update times for the communication quality index values at the respective points, a communication quality image which indicates the communication quality index values at the respective points, and a map image in which the update target point is displayed in superimposition on a travel route along which the plural haulage vehicles travel.

12. The fleet operations management server according to claim 10, further comprising:

a travel-permitted zone setting unit that sets, for each of the plural haulage vehicles, at least one of segments of a section of a preset travel route in the mine as a travel-permitted zone in which the haulage vehicle is permitted to travel, a display unit that produces and displays a map image in which the update target point and the travel-permitted zone are displayed in superimposition on the travel route along which the plural haulage vehicles travel, and an input unit that receives an operation that sets the displayed travel-permitted zone or changes a length of the travel-permitted zone;

wherein the travel-permitted zone setting unit performs, according to the operation, at least one of the setting of the travel-permitted zone and the changing of the length of the travel-permitted zone.

* * * * *